United States Patent
Barthes et al.

(10) Patent No.: US 11,880,076 B2
(45) Date of Patent: Jan. 23, 2024

(54) FIBER OPTIC ADAPTER ASSEMBLIES INCLUDING A CONVERSION HOUSING AND A RELEASE HOUSING

(71) Applicant: Corning Research & Development Corporation, Corning, NY (US)

(72) Inventors: Guy Barthes, Pontchateau (FR); Thierry Luc Alain Dannoux, Avon (FR); Michel Teva Menguy, La Chevallerais (FR); Felice Scotta, Savigny le Temple (FR)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 5 days.

(21) Appl. No.: 17/527,311

(22) Filed: Nov. 16, 2021

(65) Prior Publication Data

US 2022/0171139 A1    Jun. 2, 2022

Related U.S. Application Data

(60) Provisional application No. 63/119,622, filed on Nov. 30, 2020.

(51) Int. Cl.
  *G02B 6/38*    (2006.01)
(52) U.S. Cl.
  CPC .......... *G02B 6/389* (2013.01); *G02B 6/3825* (2013.01); *G02B 6/3831* (2013.01); *G02B 6/3843* (2013.01)
(58) Field of Classification Search
  CPC ........ G02B 6/38; G02B 6/389; G02B 6/3831; G02B 6/3825; G02B 6/3843
  See application file for complete search history.

(56) References Cited

U.S. PATENT DOCUMENTS 3,074,107 A    1/1963  Kiyoshi et al.
3,532,783 A   10/1970  Pusey et al.
(Continued)

FOREIGN PATENT DOCUMENTS

AU    2006232206 A1   10/2006
CN       1060911 A    5/1992
(Continued)

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.
(Continued)

*Primary Examiner* — Tina M Wong
(74) *Attorney, Agent, or Firm* — Tamika A. Crawl-Bey

(57) ABSTRACT

A fiber optic connector assembly includes a connector housing defining locking portion defined, an adapter assembly selectively coupled to the connector housing, the adapter assembly including a conversion housing extending around the connector housing and defining a conversion retention member that is positionable between an engaged position, in which the conversion retention member restricts movement of the connector housing with respect to the adapter assembly in an axial direction, and a disengaged position, in which the connector housing is movable with respect to the adapter assembly in the axial direction, and a release housing positioned between the conversion housing and the connector housing, the release housing defining a release front end positionable at least partially within the conversion housing, and a release face selectively engageable with the conversion retention member and configured to move the conversion retention member from the engaged position to the disengaged position.

15 Claims, 12 Drawing Sheets

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,842,363 A | 6/1989 | Margolin et al. |
| 4,844,570 A | 7/1989 | Tanabe |
| 4,854,664 A | 8/1989 | Mccartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Ampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Eung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,317,663 A | 5/1994 | Beard et al. |
| 5,321,917 A | 6/1994 | Franklin et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Loyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Wano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,789,701 A | 8/1998 | Wettengel et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,579 B1 | 3/2001 | Selfridge et al. |
| 6,206,581 B1 | 3/2001 | Driscoll et al. |
| 6,220,762 B1 | 4/2001 | Kanai et al. |
| 6,224,268 B1 | 5/2001 | Manning et al. |

(56) References Cited

U.S. PATENT DOCUMENTS

| | | |
|---|---|---|
| 6,224,270 B1 | 5/2001 | Nakajima et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,287,016 B1 | 9/2001 | Weigel |
| 6,293,710 B1 | 9/2001 | Lampert et al. |
| 6,298,190 B2 | 10/2001 | Waldron et al. |
| 6,305,849 B1 | 10/2001 | Roehrs et al. |
| 6,321,013 B1 | 11/2001 | Hardwick et al. |
| 6,356,390 B1 | 3/2002 | Hall, Jr. |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,402,388 B1 | 6/2002 | Mazu et al. |
| 6,404,962 B1 | 6/2002 | Hardwick et al. |
| 6,409,391 B1 | 6/2002 | Chang |
| D460,043 S | 7/2002 | Fan Wong |
| 6,422,764 B1 | 7/2002 | Marrs et al. |
| 6,427,035 B1 | 7/2002 | Mahony |
| 6,428,215 B1 | 8/2002 | Nault |
| 6,439,780 B1 | 8/2002 | Mudd et al. |
| 6,466,725 B2 | 10/2002 | Battey et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,533,468 B2 | 3/2003 | Nakajima et al. |
| 6,536,956 B2 | 3/2003 | Uther et al. |
| 6,539,147 B1 | 3/2003 | Mahony |
| 6,540,410 B2 | 4/2003 | Childers et al. |
| 6,542,652 B1 | 4/2003 | Mahony |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | McPhee et al. |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,695,489 B2 | 2/2004 | Nault |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,146 B2 | 6/2004 | Parris |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Oder et al. |
| 6,809,265 B1 | 10/2004 | Gladd et al. |
| 6,841,729 B2 | 1/2005 | Sakabe et al. |
| 6,848,838 B2 | 2/2005 | Doss et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,899,467 B2 | 5/2005 | McDonald et al. |
| 6,908,233 B2 | 6/2005 | Nakajima et al. |
| 6,909,821 B2 | 6/2005 | Ravasio et al. |
| 6,916,120 B2 | 7/2005 | Zimmel et al. |
| 6,918,704 B2 | 7/2005 | Marrs et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,011,454 B2 | 3/2006 | Caveney et al. |
| 7,013,074 B2 | 3/2006 | Battey et al. |
| 7,025,507 B2 | 4/2006 | De Marchi |
| 7,033,191 B1 | 4/2006 | Cao |
| 7,044,650 B1 | 5/2006 | Tran et al. |
| 7,052,185 B2 | 5/2006 | Rubino et al. |
| 7,079,734 B2 | 7/2006 | Seddon et al. |
| 7,088,899 B2 | 8/2006 | Reagan et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,103,255 B2 | 9/2006 | Reagan et al. |
| 7,103,257 B2 | 9/2006 | Donaldson et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,118,283 B2 | 10/2006 | Nakajima et al. |
| 7,118,284 B2 | 10/2006 | Nakajima et al. |
| 7,120,347 B2 | 10/2006 | Blackwell et al. |
| 7,137,742 B2 | 11/2006 | Theuerkorn et al. |
| 7,146,089 B2 | 12/2006 | Reagan et al. |
| 7,146,090 B2 | 12/2006 | Vo et al. |
| 7,150,567 B1 | 12/2006 | Luther et al. |
| 7,165,893 B2 | 1/2007 | Schmitz |
| 7,171,102 B2 | 1/2007 | Reagan et al. |
| 7,178,990 B2 | 2/2007 | Caveney et al. |
| 7,184,634 B2 | 2/2007 | Hurley et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Ail et al. |
| 7,241,056 B1 | 7/2007 | Kuffel et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,270,487 B2 | 9/2007 | Billman et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| D574,775 S | 8/2008 | Amidon |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,467,896 B2 | 12/2008 | Melton et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |

(56) References Cited

U.S. PATENT DOCUMENTS

| | | |
|---|---|---|
| 7,489,849 B2 | 2/2009 | Reagan et al. |
| 7,492,996 B2 | 2/2009 | Kowalczyk et al. |
| 7,497,896 B2 | 3/2009 | Bromet et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Ziwei |
| 7,709,733 B1 | 5/2010 | Plankell |
| 7,712,971 B2 | 5/2010 | Lee et al. |
| 7,713,679 B2 | 5/2010 | Ishiduka et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,015 B2 | 8/2010 | Melton et al. |
| 7,785,019 B2 | 8/2010 | Ewallen et al. |
| 7,802,926 B2 | 9/2010 | Eeman et al. |
| 7,805,044 B2 | 9/2010 | Reagan et al. |
| 7,806,599 B2 | 10/2010 | Margolin et al. |
| 7,811,006 B2 | 10/2010 | Milette et al. |
| 7,820,090 B2 | 10/2010 | Morrow et al. |
| 7,844,148 B2 | 11/2010 | Jenkins et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,942,590 B2 | 5/2011 | Lu et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,770,861 B2 | 7/2014 | Smith et al. |
| 8,770,862 B2 | 7/2014 | Lu et al. |
| D711,320 S | 8/2014 | Yang et al. |
| 8,821,036 B2 | 9/2014 | Shigehara |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,081,154 B2 | 7/2015 | Zimmel et al. |
| 9,146,364 B2 | 9/2015 | Chen et al. |
| D741,803 S | 10/2015 | Davidson, Jr. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |

(56) References Cited

U.S. PATENT DOCUMENTS

| | | |
|---|---|---|
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Power et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,444 B2 | 12/2016 | Barnette et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,557,504 B2 | 1/2017 | Holmberg et al. |
| 9,581,775 B2 | 2/2017 | Kondo et al. |
| 9,588,304 B2 | 3/2017 | Durrant et al. |
| D783,618 S | 4/2017 | Wu et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Claessens et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| D810,029 S | 2/2018 | Robert et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,224 B2 | 3/2018 | Liu et al. |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,288,821 B2 | 5/2019 | Isenhour |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| D880,423 S | 4/2020 | Obata et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Ivan et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,487 B1 * | 12/2020 | Ignatius ............... G02B 6/3879 |
| 10,852,498 B2 | 12/2020 | Hill et al. |
| 10,852,499 B2 | 12/2020 | Cooke et al. |

(56) References Cited

U.S. PATENT DOCUMENTS

| | | |
|---|---|---|
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 2001/0002220 A1 | 5/2001 | Throckmorton et al. |
| 2001/0012428 A1 | 8/2001 | Nakajima et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0122653 A1 | 9/2002 | Donaldson et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0080555 A1 | 5/2003 | Griffioen et al. |
| 2003/0086664 A1 | 5/2003 | Moisel et al. |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0047566 A1 | 3/2004 | McDonald et al. |
| 2004/0052474 A1 | 3/2004 | Lampert et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0206542 A1 | 10/2004 | Gladd et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0054237 A1 | 3/2005 | Gladd et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213897 A1 | 9/2005 | Palmer et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0025665 A1 | 2/2007 | Dean et al. |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044137 A1 | 2/2008 | Luther et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0240658 A1 | 10/2008 | Eeman et al. |

(56) References Cited

U.S. PATENT DOCUMENTS

| | | |
|---|---|---|
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1 | 3/2010 | Lochkovic et al. |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303416 A1 | 12/2010 | Danley et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0057830 A1 | 3/2012 | Taira et al. |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0051734 A1 | 2/2013 | Shen et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0044397 A1 | 2/2014 | Hikosaka et al. |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0144883 A1 | 5/2015 | Sendelweck |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |

(56) References Cited

U.S. PATENT DOCUMENTS

| | | |
|---|---|---|
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0286011 A1 | 10/2015 | Nhep |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2016/0349458 A1 | 12/2016 | Murray et al. |
| 2016/0356963 A1 | 12/2016 | Liu et al. |
| 2017/0023758 A1 | 1/2017 | Reagan et al. |
| 2017/0038538 A1 | 2/2017 | Isenhour et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0003902 A1 | 1/2018 | Rosson et al. |
| 2018/0031774 A1 | 2/2018 | Van et al. |
| 2018/0079569 A1 | 3/2018 | Simpson |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267265 A1 | 9/2018 | Zhang et al. |
| 2018/0321448 A1 | 11/2018 | Wu et al. |
| 2018/0329149 A1 | 11/2018 | Mullaney et al. |
| 2018/0348447 A1 | 12/2018 | Nhep et al. |
| 2018/0372962 A1 | 12/2018 | Isenhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0014987 A1 | 1/2019 | Sasaki et al. |
| 2019/0018210 A1 | 1/2019 | Coan et al. |
| 2019/0033531 A1 | 1/2019 | Taira et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0258010 A1 | 8/2019 | Anderson et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0361177 A1 | 11/2019 | Aoshima et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Hill et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116958 A1 | 4/2020 | Dannoux et al. |
| 2020/0116962 A1 | 4/2020 | Dannoux et al. |
| 2020/0124805 A1 | 4/2020 | Rosson et al. |
| 2020/0124812 A1 | 4/2020 | Dannoux et al. |
| 2020/0132939 A1 | 4/2020 | Coenegracht et al. |
| 2020/0132941 A1 | 4/2020 | Otsuka et al. |
| 2020/0150356 A1 | 5/2020 | Lu |
| 2020/0174201 A1 | 6/2020 | Cote et al. |
| 2020/0183097 A1 | 6/2020 | Chang et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0348476 A1 | 11/2020 | Hill et al. |

(56) References Cited

U.S. PATENT DOCUMENTS

| | | | |
|---|---|---|---|
| 2020/0371306 A1 | 11/2020 | Mosier et al. | |
| 2020/0393629 A1 | 12/2020 | Hill et al. | |
| 2022/0171138 A1* | 6/2022 | Barthes | G02B 6/3897 |
| 2022/0171140 A1* | 6/2022 | Barthes | G02B 6/3825 |

FOREIGN PATENT DOCUMENTS

| | | | |
|---|---|---|---|
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 103782209 A | 5/2014 |
| CN | 104007514 A | 8/2014 |
| CN | 104064903 A | 9/2014 |
| CN | 104280830 A | 1/2015 |
| CN | 104603656 A | 5/2015 |
| CN | 104704411 A | 6/2015 |
| CN | 105467529 A | 4/2016 |
| CN | 105683795 A | 6/2016 |
| CN | 110608208 A | 12/2019 |
| CN | 110954996 A | 4/2020 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0026553 A1 | 4/1981 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0547788 A1 | 6/1993 |
| EP | 0762171 A1 | 3/1997 |
| EP | 0782025 A1 | 7/1997 |
| EP | 0855610 A2 | 7/1998 |
| EP | 0856751 A1 | 8/1998 |
| EP | 0856761 A1 | 8/1998 |
| EP | 0940700 A2 | 9/1999 |
| EP | 0949522 A2 | 10/1999 |
| EP | 0957381 A1 | 11/1999 |
| EP | 0997757 A2 | 5/2000 |
| EP | 1065542 A1 | 1/2001 |
| EP | 1122566 A2 | 8/2001 |
| EP | 1243957 A2 | 9/2002 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3207223 A1 | 8/2017 |
| EP | 3234672 A1 | 10/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| ES | 1184287 U | 5/2017 |
| FR | 2485754 A1 | 12/1981 |
| GB | 2022284 A | 12/1979 |
| GB | 2154333 A | 9/1985 |
| GB | 2169094 A | 7/1986 |
| JP | 52-030447 A | 3/1977 |
| JP | 58-142308 A | 8/1983 |
| JP | 61-145509 A | 7/1986 |
| JP | 62-054204 A | 3/1987 |
| JP | 63-020111 A | 1/1988 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-106765 A | 4/1993 |
| JP | 05-142439 A | 6/1993 |
| JP | 05-297246 A | 11/1993 |
| JP | 06-320111 A | 11/1994 |
| JP | 07-318758 A | 12/1995 |
| JP | 08-050211 A | 2/1996 |
| JP | 08-054522 A | 2/1996 |
| JP | 08-062432 A | 3/1996 |
| JP | 08-292331 A | 11/1996 |
| JP | 09-049942 A | 2/1997 |
| JP | 09-135526 A | 5/1997 |
| JP | 09-159867 A | 6/1997 |
| JP | 09-203831 A | 8/1997 |
| JP | 09-325223 A | 12/1997 |
| JP | 09-325249 A | 12/1997 |
| JP | 10-170781 A | 6/1998 |
| JP | 10-332953 A | 12/1998 |
| JP | 10-339826 A | 12/1998 |
| JP | 11-064682 A | 3/1999 |
| JP | 11-119064 A | 4/1999 |
| JP | 11-248979 A | 9/1999 |
| JP | 11-271582 A | 10/1999 |
| JP | 11-281861 A | 10/1999 |
| JP | 11-326693 A | 11/1999 |
| JP | 11-337768 A | 12/1999 |
| JP | 11-352368 A | 12/1999 |
| JP | 2000-002828 A | 1/2000 |
| JP | 2001-116968 A | 4/2001 |
| JP | 2001-290051 A | 10/2001 |
| JP | 2002-520987 A | 7/2002 |
| JP | 3296698 B2 | 7/2002 |
| JP | 2002-250987 A | 9/2002 |
| JP | 2003-009331 A | 1/2003 |
| JP | 2003-070143 A | 3/2003 |
| JP | 2003-121699 A | 4/2003 |
| JP | 2003-177279 A | 6/2003 |
| JP | 2003-302561 A | 10/2003 |

(56) References Cited

FOREIGN PATENT DOCUMENTS

| | | |
|---|---|---|
| JP | 2004-361521 A | 12/2004 |
| JP | 2005-024789 A | 1/2005 |
| JP | 2005-031544 A | 2/2005 |
| JP | 2005-077591 A | 3/2005 |
| JP | 2005-114860 A | 4/2005 |
| JP | 2005-520987 A | 7/2005 |
| JP | 2006-023502 A | 1/2006 |
| JP | 2006-146084 A | 6/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-018003 A | 1/2011 |
| JP | 2011-033698 A | 2/2011 |
| JP | 2013-041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207223 U | 11/2016 |
| JP | 3207233 U | 11/2016 |
| KR | 10-2013-0081087 A | 7/2013 |
| TW | 222688 B | 4/1994 |
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2013/177016 A1 | 11/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/006176 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Clearfield, "Fieldshield Optical Fiber Protection System: Installation Manual." for part No. 016164. Last Updated Dec. 2014. 37 pgs.
Clearfield, "FieldShield SC and LC Pushable Connectors," Last Updated Jun. 1, 2018, 2 pgs.
Clearfield, "FieldShield SmarTerminal: Hardened Pushable Connectors" Last Updated Jun. 29, 2018, 2 pgs.
Corning Cable Systems, "SST Figure-8 Drop Cables 1-12 Fibers", Preliminary Product Specifications, 11 pgs. (2002).
Corning Cable Systems, "SST-Drop (armor) Cables 1-12 Fibers", Product Specifications, 2 pgs. (2002).
Digital Optical Audio Cable Toslink Cable. Date: Jun. 27, 2019 [online], [Site visited Mar. 2, 2021], Available from Internet URL: https://www.amazon.com/dp/B07TJMP4TP/ (Year: 2019).
Faulkner et al. "Optical networks for local lopp applications," J. Lightwave Technol. 0733-8724 7(11), 17411751 (1989).
Fiber Systems International: Fiber Optic Solutions, data, "TFOCA-II 4-Channel Fiber Optic Connector" sheet. 2 pgs.
Gold Plated Toslink. Date: Feb. 5, 2015. [online], [Site visited Mar. 2, 2021], Available from Internet URL: https://www.amazon.com/dp/B00T8HWV62/ (Year: 2015).
Infolite—Design and Data Specifications, 1 pg. Retrieved Feb. 21, 2019.
Nawata, "Multimode and Single-Mode Fiber Connectors Technology"; IEEE Journal of Quantum Electronics, vol. QE-16, No. 6 Published Jun. 1980.
Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Schneier, Bruce; "Applied Cryptography: Protocols, Algorithms, and Source Code in C," Book. 1995 Sec. 10.3, 12.2, 165 Pgs.
Stratos: Lightwave., "Innovation Brought to Light", Hybrid HMA Series, Hybrid Multi Application, 2 pgs.
Stratos: Ughtwave., "Innovation Brought to Light", Hybrid HMA Series, Hybrid Multi Application, 2 pgs.

(56) References Cited

OTHER PUBLICATIONS

UPC Optic Fiber Quick Connector. Date: May 13, 2016 [online], [Site visited Mar. 2, 2021], Available from Internet URL: https://www.amazon.com/dp/B01FLUV5DE/ (Year: 2016).
Wang et al. "Opto-VLSI-based dynamic optical splitter," Electron. Lett.0013-5194 10.1049/el:20046715 40(22), 14451446 (2004).
Wang et al. "Opto-VLSI-based dynamic optical splitter," Electron. Lett.0013-5194 10.1049/el:20046715 40(22), F14451446 (2004).
Xiao et al. "1 xN wavelength selective adaptive optical power splitter for wavelength-division-multiplexed passive optical networks," Optics & Laser Technology 68, pp. 160-164, May 2015.

\* cited by examiner

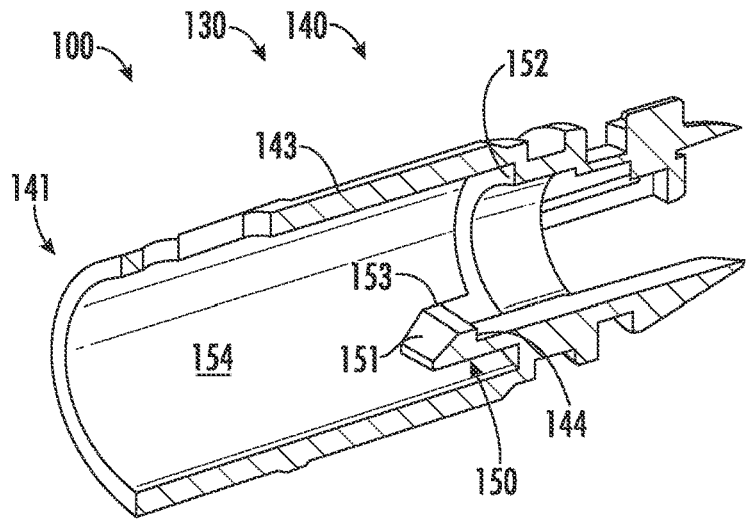
FIG. 7A
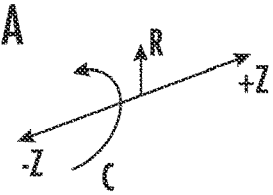
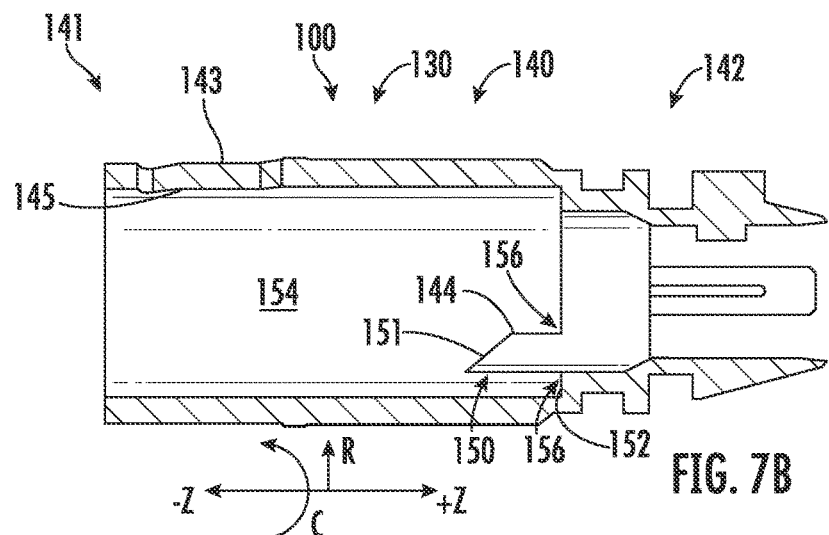
FIG. 7B
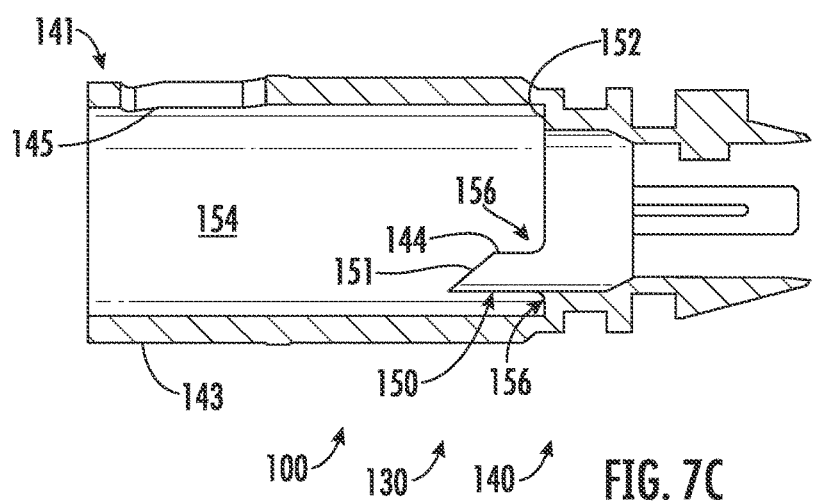
FIG. 7C

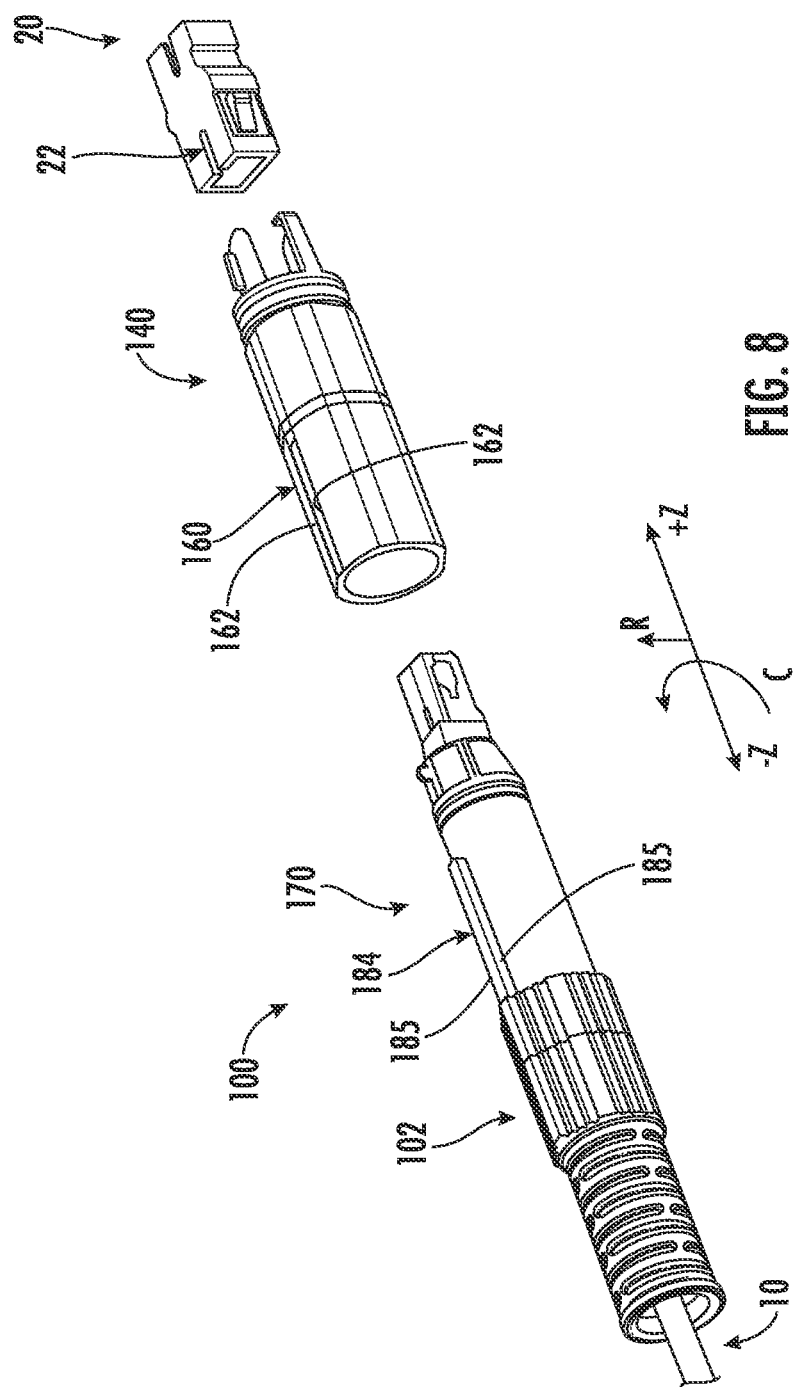

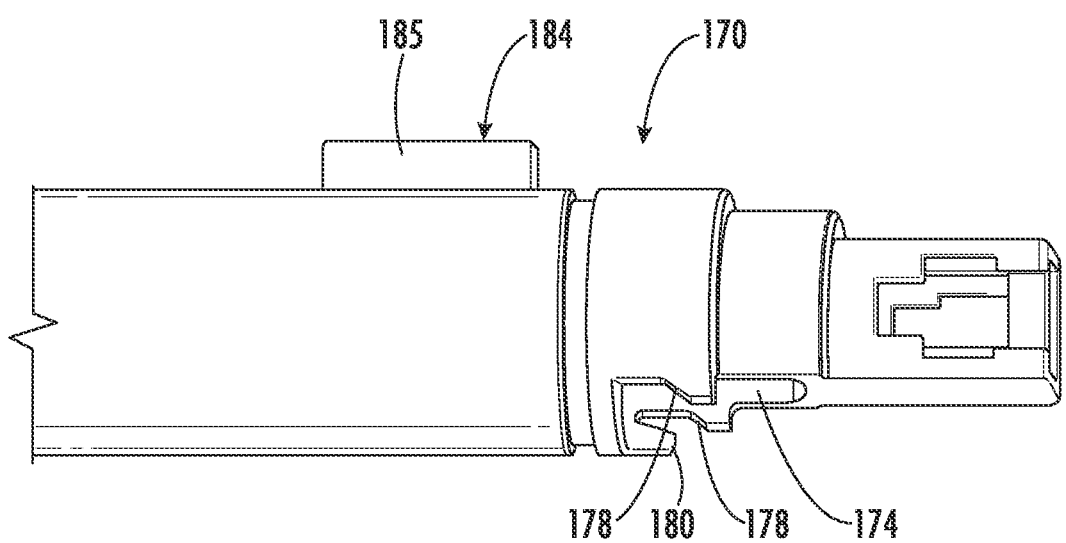
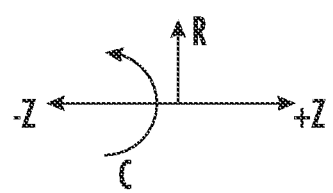
FIG. 11

FIBER OPTIC ADAPTER ASSEMBLIES INCLUDING A CONVERSION HOUSING AND A RELEASE HOUSING

CROSS-REFERENCE TO RELATED APPLICATIONS

This application claims the benefit of priority under 35 U.S.C. § 119 of U.S. Provisional Application No. 63/119,622, filed Nov. 30, 2020, the content of which is relied upon and incorporated herein by reference in its entirety.

BACKGROUND

The present disclosure generally relates to fiber optic adapter assemblies for connecting optical fibers, and more particularly to fiber optic adapter assemblies including a conversion housing and a release housing Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles in the network. These terminated optical fibers and fiber optic cables are available in a variety of connectorized formats including, for example, hardened OptiTap® and OptiTip® connectors, field-installable UniCam® connectors, preconnectorized single or multi-fiber cable assemblies with SC, FC, or LC connectors, etc., all of which are available from Corning Incorporated, with similar products available from other manufacturers, as is well documented in the patent literature.

The optical receptacles with which the aforementioned terminated fibers and cables are coupled are commonly provided at optical network units (ONUs), network interface devices (NIDs), and other types of network devices or enclosures, and often require hardware that is sufficiently robust to be employed in a variety of environments under a variety of installation conditions. These conditions may be attributable to the environment in which the connectors are employed, or the habits of the technicians handling the hardware. Consequently, there is a continuing drive to enhance the robustness of these connectorized assemblies, while preserving quick, reliable, and trouble-free optical connection to the network.

SUMMARY

Fiber optic connectors, connectorized cable assemblies, closure assemblies, and methods for connecting fiber optic connectors to, and disconnecting fiber optic connectors from closure assemblies are disclosed herein.

In a first aspect A1, the present disclosure provides a fiber optic connector assembly comprising a connector housing defining a rotationally-discrete locking portion defined on an outer surface of the connector housing, an adapter assembly selectively coupled to the connector housing, the adapter assembly comprising a conversion housing extending around the connector housing and defining a conversion front end and a conversion retention member that is positionable between an engaged position, in which the conversion retention member restricts movement of the connector housing with respect to the adapter assembly in an axial direction, and a disengaged position, in which the connector housing is movable with respect to the adapter assembly in the axial direction, and a release housing positioned between the conversion housing and the connector housing, the release housing defining a release front end positionable at least partially within the conversion housing, and a release face selectively engageable with the conversion retention member and configured to move the conversion retention member from the engaged position to the disengaged position.

In a second aspect A2, the present disclosure provides the fiber optic connector assembly of aspect A1, further comprising a boot coupled to the release housing opposite the release front end.

In a third aspect A3, the present disclosure provides the fiber optic connector assembly of either of aspects A1 or A2, wherein the conversion retention member of the conversion housing defines forwardly-facing connector engagement face, and the rotationally-discrete locking portion of the connector housing defining a connector locking face.

In a fourth aspect A4, the present disclosure provides the fiber optic connector assembly of aspect A3, wherein the conversion retention member of the conversion housing defines a release face that is transverse to the forwardly-facing connector engagement face.

In a fifth aspect A5, the present disclosure provides the fiber optic connector assembly of aspect A4, wherein the release face faces inward in a radial direction that is transverse to the axial direction.

In a sixth aspect A6, the present disclosure provides the fiber optic connector assembly of any of aspects A1-A5, wherein the release housing defines one or more release faces that are selectively engageable with the conversion housing.

In a seventh aspect A7, the present disclosure provides the fiber optic connector assembly of aspect A6, wherein the one or more release faces face outwardly in a radial direction that is transverse to the axial direction.

In an eighth aspect A8, the present disclosure provides the fiber optic connector assembly of any of aspects A1-A7, wherein the conversion housing defines a conversion inner sidewall and a forward conversion ledge and a conversion inner space, and wherein the conversion retention member extends rearwardly from the forward conversion ledge into the conversion inner space.

In a ninth aspect A9, the present disclosure provides the fiber optic connector assembly of aspect A8, wherein the conversion retention member intersects the forward conversion ledge at a transition intersection, wherein at least a portion of the transition intersection is transverse to the forward conversion ledge and the conversion retention member.

In a tenth aspect A10, the present disclosure provides the fiber optic connector assembly of any of aspects A1-A9, wherein the release housing defines a release outer surface extending the axial direction, and a release slot extending through the release outer surface, and wherein the conversion retention member is positioned at least partially within the release slot in the engaged position.

In an eleventh aspect A11, the present disclosure provides the fiber optic connector assembly of aspect A10, wherein the release housing defines a release retainer extending over at least a portion of the release slot.

In a twelfth aspect A12, the present disclosure provides the fiber optic connector assembly of either of aspects A10 or A11, wherein the release housing defines a release face positioned adjacent to the release slot, wherein the release face faces outward in a radial direction that is transverse to the axial direction.

In a thirteenth aspect A13, the present disclosure provides the fiber optic connector assembly of aspect A12, wherein the release face of the release housing is a first release face, and wherein the release housing further comprises a second release face, wherein the first release face and the second release face are positioned on opposite sides of the release slot.

In a fourteenth aspect A14, the present disclosure provides the fiber optic connector assembly of any of aspects A1-A13, wherein the conversion front end defines a forward conversion keying feature structurally configured to engage an SC connector.

In a fifteenth aspect A15, the present disclosure provides the fiber optic connector assembly of any of aspects A1-A14, wherein the release housing defines an inward release keying portion and wherein the connector housing defines a connector keying portion that is engaged with the inward release keying portion.

In a sixteenth aspect A16, the present disclosure provides the fiber optic connector assembly of any of aspects A1-A15, wherein the release housing defines an outward release keying portion and wherein the conversion housing defines a rearward conversion keying feature engaged with the outward release keying portion.

In a seventeenth aspect A17, the present disclosure provides the fiber optic connector assembly of aspect A1, wherein the conversion retention member of the conversion housing defines forwardly-facing connector engagement face, the rotationally-discrete locking portion of the connector housing defining a connector locking face engaged with the forwardly-facing connector engagement face when the conversion retention member is in the engaged position, the conversion retention member of the conversion housing defines a release face that is transverse to the forwardly-facing connector engagement face, the release housing defines one or more release faces that are selectively engageable with the conversion housing, and the release face faces inward in a radial direction that is transverse to the axial direction.

In an eighteenth aspect A18, the present disclosure provides a fiber optic connector assembly comprising a connector housing defining a locking portion on an outer surface of the connector housing, and a connector keying portion on the outer surface of the connector housing, an adapter assembly selectively coupled to the connector housing, the adapter assembly comprising a conversion housing extending around the connector housing and defining a conversion front end and a conversion retention member selectively engaged with the locking portion of the connector housing, and a release housing positioned between the conversion housing and the connector housing, the release housing defining an inward release keying portion engaged with the connector keying portion, and a release face that is selectively engageable with the conversion retention member.

In a nineteenth aspect A19, the present disclosure provides the fiber optic connector assembly of aspect A18, wherein the conversion housing defines a forward conversion keying feature structurally configured to engage an SC connector.

In a twentieth aspect A20, the present disclosure provides the fiber optic connector assembly of aspect A19, wherein the conversion housing further defines a conversion guide extending outward from the conversion housing and aligned with the forward conversion keying feature.

In a twenty-first aspect A21, the present disclosure provides the fiber optic connector assembly of any of aspects A18-A20, wherein the release housing defines an outward release keying portion on a release outer surface of the release housing.

In a twenty-second aspect A22, the present disclosure provides the fiber optic connector assembly of aspect A21, wherein the conversion housing defines a rearward conversion keying feature engaged with the outward release keying portion.

In a twenty-third aspect A23, the present disclosure provides the fiber optic connector assembly of aspect A22, wherein the rearward conversion keying feature defines a slot engaged with the outward release keying portion of the release housing.

In a twenty-fourth aspect A24, the present disclosure provides the fiber optic connector assembly of any of aspects A21-A23, wherein the outward release keying portion is formed as a positive surface projection extending outward from the release outer surface and defines opposing outward release contact surfaces.

In a twenty-fifth aspect A25, the present disclosure provides the fiber optic connector assembly of any of aspects A18-A24, wherein the connector keying portion is formed as a negative cut out and defines opposing connector contact surfaces.

In a twenty-sixth aspect A26, the present disclosure provides the fiber optic connector assembly of any of aspects A18-A23, wherein the inward release keying portion is formed as a positive surface projection extending inward from a release inner surface in a radial direction that is transverse to an axial direction.

In a twenty-seventh aspect A27, the present disclosure provides the fiber optic connector assembly of aspect A18, wherein the conversion housing defines a forward conversion keying feature structurally configured to engage an SC connector, the release housing defines an outward release keying portion on a release outer surface of the release housing, and the conversion housing defines a rearward conversion keying feature engaged with the outward release keying portion.

In a twenty-eighth aspect A28, the present disclosure provides a method for disconnecting a fiber optic connector from a closure, the method comprising moving a release housing in an axial direction with respect to a conversion housing engaged with a connector housing, wherein the conversion housing comprises a conversion retention member engaged with a rotationally-discrete locking portion of the connector housing, engaging the conversion retention member of the conversion housing with a release face of the release housing, thereby moving the conversion retention member out of engagement with the rotationally-discrete locking portion of the connector housing, and removing the connector housing from the conversion housing.

In a twenty-ninth aspect A29, the present disclosure provides the method of aspect A28, wherein moving the release housing in the axial direction with respect to the conversion housing comprises moving a boot coupled to the release housing in the axial direction with respect to the conversion housing.

In a thirtieth aspect A30, the present disclosure provides the method of either of aspects A28 or A29, wherein moving the conversion retention member out of engagement with the rotationally-discrete locking portion of the connector housing comprises deflecting the conversion retention member in a radially-outward direction.

In a thirty-first aspect A31, the present disclosure provides the method of any of aspects A28-A30, wherein moving the conversion retention member out of engagement with the rotationally-discrete locking portion of the connector housing comprises moving a forwardly-facing connector engagement face out of the conversion retention member radially outward from a connector engagement face of rotationally-discrete locking portion of the connector housing.

Additional features of fiber optic connectors, connectorized cable assemblies, closure assemblies, and methods for connecting fiber optic connectors to, and disconnecting fiber optic connectors from closure assemblies will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 7A schematically depicts an isometric section view of the conversion housing of FIG. 5, according to one or more embodiments shown and described herein;

FIG. 7B schematically depicts a side section view of the conversion housing of FIG. 5, according to one or more embodiments shown and described herein;

FIG. 7C schematically depicts a side section view of another conversion housing, according to one or more embodiments shown and described herein;

FIG. 8 schematically depicts an exploded isometric view of the fiber optic connector assembly of FIG. 2A and a receptacle, according to one or more embodiments shown and described herein;

FIG. 11 schematically depicts a side isometric view of another release housing, according to one or more embodiments shown and described herein.

DETAILED DESCRIPTION

Figure 1:
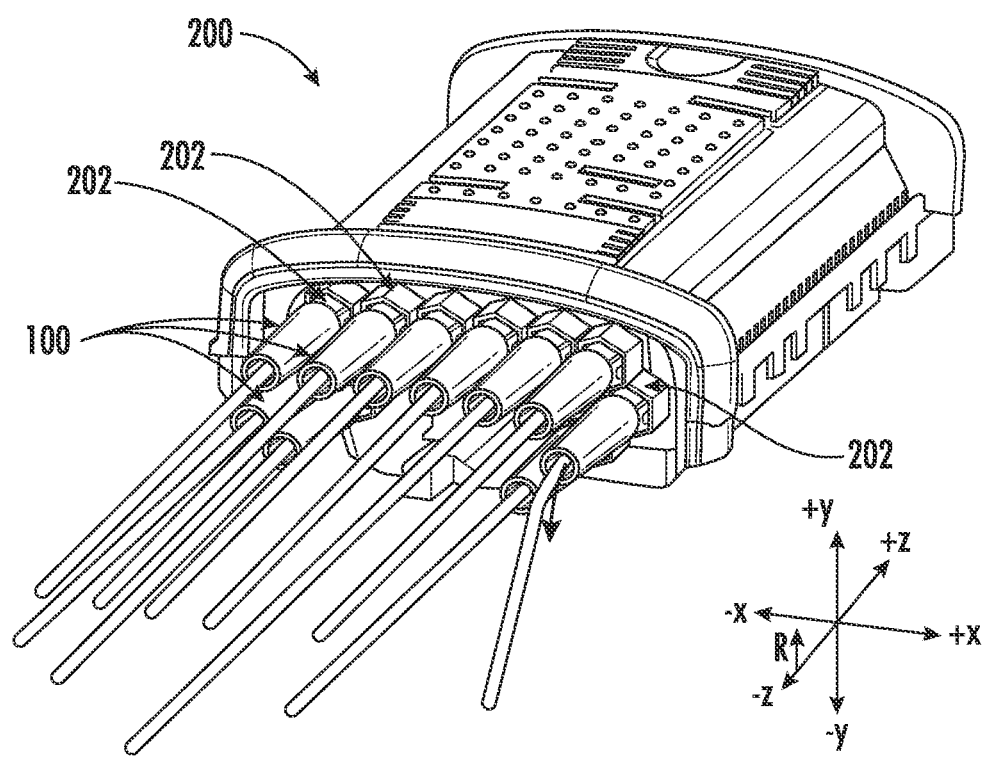
FIG. 1 schematically depicts an isometric view of a closure and fiber optic connector assemblies inserted at least partially into the closure, according to one or more embodiments shown and described herein.

Reference will now be made in detail to embodiments of optical adapter assemblies, examples of which are illustrated in the accompanying drawings. Whenever possible, the same reference numerals will be used throughout the drawings to refer to the same or like parts. Embodiments described herein are directed to fiber optic connector assemblies including a connector housing and an adapter assembly including a conversion housing and a release housing. The conversion housing may generally permit the connector housing to be engaged with a dissimilar coupling, for example of a closure. The connector housing may be selectively coupled to, and may be releasable from the conversion housing via the release housing, thereby allowing the connector housing to be selectively coupled to and released from the dissimilar coupling and/or closure.

As used herein, the term "longitudinal direction" refers to the forward-rearward direction of the components described herein (i.e., in the +/−z-direction as depicted). The term "lateral direction" refers to the cross-wise direction of the components (i.e., in the +/−x-direction as depicted), and is transverse to the longitudinal direction. The term "vertical direction" refers to the upward-downward direction of the components (i.e., in the +/−y-direction as depicted). The term "axial direction" generally refers to the longitudinal direction of fiber optic connector assemblies described herein. The term "radial direction" refers to the direction extending outward from the longitudinal direction of fiber optic connector assemblies described herein (i.e., in the R-direction as depicted). The term "circumferential direction refers to the direction extending around the longitudinal direction of fiber optic connector assemblies described herein (i.e., in the C-direction as depicted).

Referring initially to FIG. 1, a closure 200 is depicted with multiple fiber optic connector assemblies 100 inserted at least partially into the closure 200. In embodiments, the closure 200 may facilitate the connection of multiple fiber optic connector assemblies 100. In some embodiments, the closure 200 may be a boite de protection d'epissurages optiques (BPEO) closure, however, it should be understood that this is merely an example. As shown in FIG. 1, closures 200 may include multiple closure openings 202 that can each receive a fiber optic connector assembly 100. In embodiments, the closure openings 202 may be positioned adjacent to one another in the vertical direction and/or in the lateral direction (i.e., in the +/−y-direction and the +/-x-direction as depicted). In other words, the closure openings 202 may be positioned on top of one another in the vertical direction, and may be placed side-by-side to one another in the lateral direction (i.e., in the +/−y-direction and the +/−x-direction as depicted, respectively). By positioning the closure openings 202 adjacent to one another in the vertical direction and the lateral direction (i.e., in the +/−y-direction and the +/−x-direction as depicted), multiple fiber optic connector assemblies 100 may be inserted into the closure 200 even when the closure 200 has a comparatively small footprint evaluated in the vertical and lateral directions. In other words, by positioning the closure openings 202 adjacent to one another in the vertical direction and the lateral direction, the number of fiber optic connector assemblies 100 inserted into the closure 200 may be increased as compared to similarly-sized closures having closure openings that are not positioned adjacent to one another in the vertical direction and the lateral direction.

However, with fiber optic connector assemblies 100 positioned adjacent to one another in the vertical direction and the lateral direction (i.e., in the +/−y-direction and the +/−x-direction as depicted), it may be difficult for users to insert and remove the fiber optic connector assemblies 100 from the closure 200. In particular, space between adjacent fiber optic connector assemblies 100 in the vertical direction and the lateral direction (i.e., in the +/−y-direction and the +/−x-direction as depicted, respectively) may be minimal. Minimal distance between the fiber optic connector assemblies 100 may make it difficult for a user to manipulate any of the fiber optic connector assemblies 100 to remove or insert the fiber optic connector assemblies 100 to the closure 200.

Figure 2:
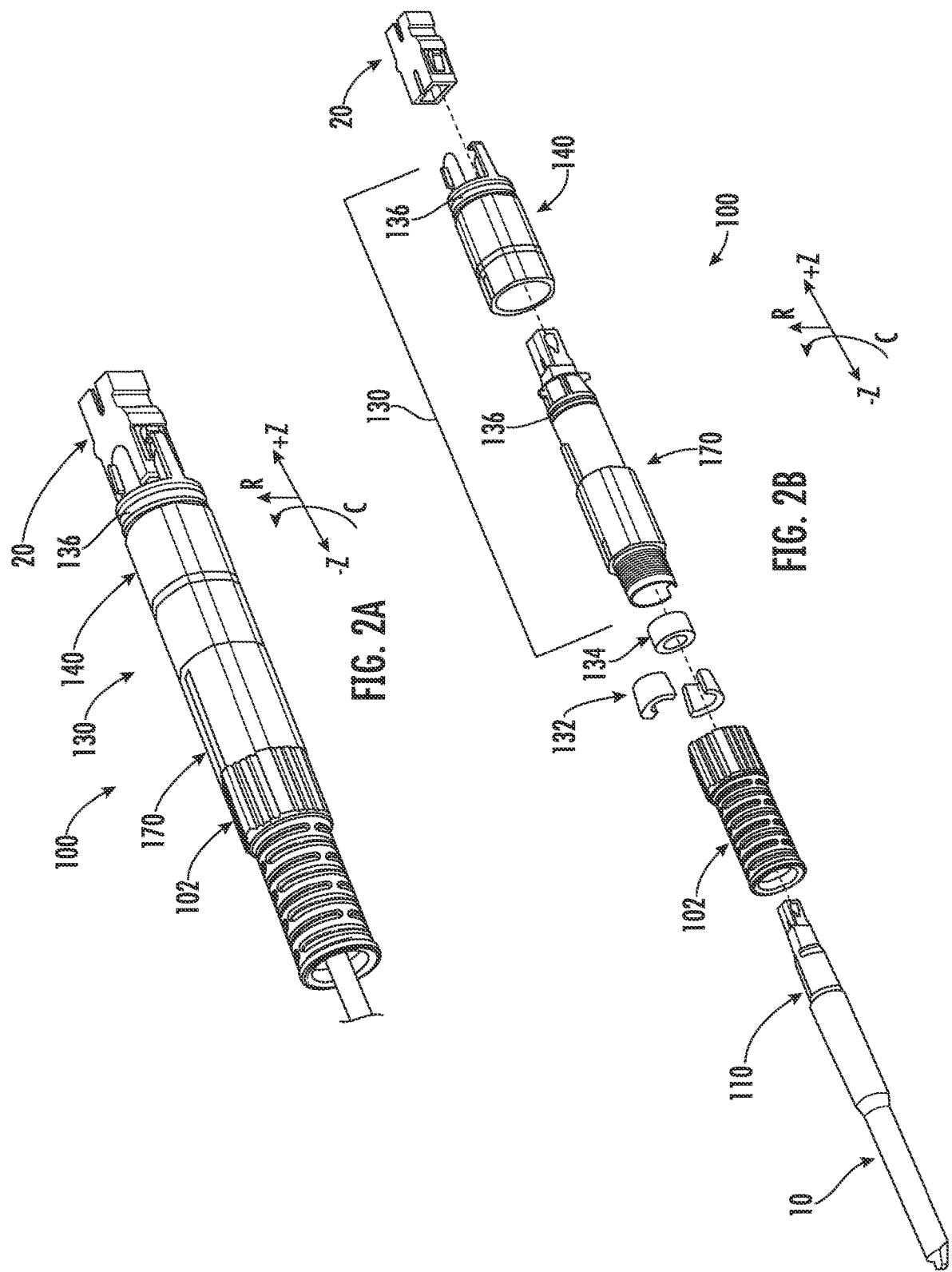
FIG. 2A schematically depicts an isometric view of a coupling and a fiber optic connector assembly including a connector housing and an adapter assembly including a conversion housing and a release housing, according to one or more embodiments shown and described herein.
FIG. 2B schematically depicts an exploded isometric view of the fiber optic connector assembly and the coupling of FIG. 2A, according to one or more embodiments shown and described herein.

Referring to FIGS. 2A and 2B, an isometric view and an exploded isometric view of a fiber optic connector assembly 100 of a fiber optic cable 10 are schematically depicted, respectively. In embodiments, the fiber optic connector assembly 100 includes a connector housing 110 and an adapter assembly 130 including a conversion housing 140 and a release housing 170. The conversion housing 140 is engageable with a coupling 20. In the embodiment depicted in FIGS. 2A and 2B, the coupling is embodied as an SC coupling, however, it should be understood that this is merely an example, and the conversion housing 140 may be engageable with any suitable coupling, for example and without limitation, an LC coupling or the like. In some embodiments, couplings 20 may be positioned at least partially within the closure openings 202 (FIG. 1), and the fiber optic connector assemblies 100 inserted into the closure 200 (FIG. 1) may each interface with a coupling 20.

In some embodiments, the fiber optic connector assembly 100 further includes a boot 102 coupled to the release housing 170. The boot 102 and the release housing 170 may be selectively movable with respect to the conversion housing 140 in the longitudinal direction (i.e., in the +/−z-direction as depicted), as described in greater detail herein.

In some embodiments, the fiber optic connector assembly 100 may include a grommet 132 and/or a washer 134. The connector housing 110 may be passed through the grommet 132 and/or the washer 134, and the grommet 132 and/or the washer 134 may restrict environmental elements (e.g., water, humidity, etc.) from reaching an interior of the fiber optic connector assembly 100. While in the embodiment depicted in FIG. 2B the grommet 132 is depicted as having a two-piece construction, it should be understood that this is merely an example. In some embodiments, the fiber optic connector assembly 100 may include one or more sealing elements 136 engaged with the release housing 170 and/or the conversion housing 140. The one or more sealing elements 136 may include o-rings or the like.

Figure 3:
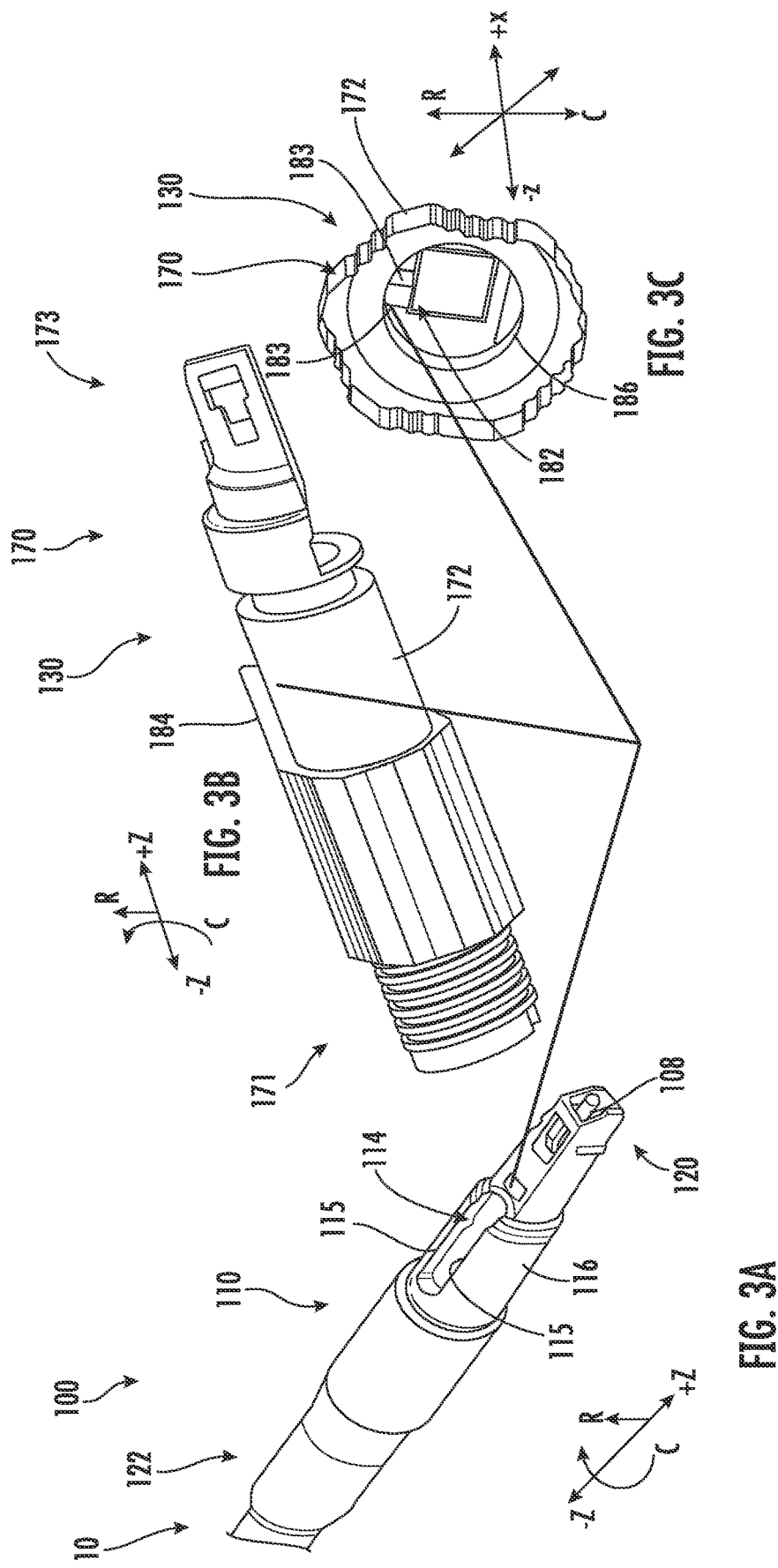
FIG. 3A schematically depicts a front isometric view of the connector housing of FIG. 2A, according to one or more embodiments shown and described herein.
FIG. 3B schematically depicts an isometric view of the release housing of FIG. 2A, according to one or more embodiments shown and described herein.
FIG. 3C schematically depicts an isometric section view of the release housing of FIG. 3B, according to one or more embodiments shown and described herein.

Referring to FIGS. 3A and 3B, a front isometric view of the connector housing 110 of the fiber optic cable 10 and an isometric view of the release housing 170 are schematically depicted, respectively. In embodiments, the connector housing 110 defines an outer surface 116 extending from a rear end 122 to a front end 120 in the longitudinal direction (i.e., in the +/- z-direction as depicted). In embodiments, a ferrule 108 may be positioned at the front end 120 of the connector housing 110. An optical fiber may extend through the ferrule 108 in the longitudinal direction (i.e., in the +/−z-direction as depicted). In embodiments in which the fiber optic cable 10 includes a single optical fiber, the optical fiber may be coaxial with the longitudinal direction (i.e., the +/−z-direction as depicted). For multifiber cables, this alignment will be offset for one, more than one, or all of the optical fibers of the fiber optic cable 10.

The connector housing 110 includes a connector keying portion 114 defined on the outer surface 116 of the connector housing 110. In embodiments, the connector keying portion 114 may be rotationally discrete on the outer surface 116 of the connector housing 110. As used herein, the term "rotationally" discrete represents a limited width-wise extent along the outer surface 116 of the connector housing 110, as the connector housing 110 is rotated in the circumferential direction C.

In embodiments, the connector keying portion 114 includes pair of opposing connector contact surfaces 115. The opposing connector contact surfaces 115 are structurally configured to inhibit rotation of the connector housing 110 in the circumferential direction C when engaged with a complementary keying portion of, for example, an optical connection port. However, some optical connection ports, such as those of the closure 200 (FIG. 1) and the coupling 20 (FIG. 2B) may not be sized and/or shaped to directly interface with the connector housing 110. In these configurations, the opposing connector contact surfaces 115 of the connector keying portion 114 may interface with a keying portion of the adapter assembly 130, and the adapter assembly 130 may interface with a keying portion of the closure 200 (FIG. 1) and/or the coupling 20 (FIG. 2B).

For example and referring to FIGS. 3B and 3C, a section view of the release housing 170 is schematically depicted. In embodiments, the release housing 170 defines a release outer surface 172 extending from a release rear end 171 to a release front end 173 in the longitudinal direction (i.e., in the +/−z-direction as depicted). In embodiments, the release housing 170 defines a release inner surface 186 opposite the release outer surface 172. In the embodiment depicted in FIG. 3C, the release housing 170 defines an inward release keying portion 182. For example, in the embodiment depicted in FIG. 3C, the inward release keying portion 182 defines a pair of opposing contact surfaces 183 extending inward from the release inner surface 186 in the radial direction R.

When assembled, the connector housing 110 may be at least partially inserted into the release housing 170. In embodiments, the connector keying portion 114 of the connector housing 110 is engageable with the inward release keying portion 182 of the release housing 170. For example, in the embodiment depicted in FIGS. 3A and 3C, the connector keying portion 114 is formed as a negative cutout extending into the connector housing 110, and the inward release keying portion 182 is formed as a positive surface projection extending from the release inner surface 186 in the radial direction R. In embodiments, the opposing connector contact surfaces 115 of the connector keying portion 114 of the connector housing 110 may engage the opposing contact surfaces 183 of the inward release keying portion 182 of the release housing 170, thereby restricting rotation of the connector housing 110 with respect to the release housing 170. Furthermore the inward release keying portion 182 of the release housing 170 may assist in ensuring rotational alignment between the connector housing 110 and the release housing 170. For example, in the embodiment depicted in FIGS. 3A and 3C, the inward release keying portion 182 may interfere with portions of outer surface 116 of the connector housing 110 other than the connector keying portion 114. Interference between the inward release keying portion 182 with the outer surface 116 of the connector housing 110 may restrict insertion of the connector housing 110 into the release housing 170 unless the connector keying portion 114 of the connector housing 110 is aligned with the inward release keying portion 182 of the release housing 170 in the circumferential direction C. In embodiments, the ferrule 108, and the optic fiber or fibers extending through the ferrule 108, may be positioned at a particular rotational orientation with respect to the connector housing 110. By allowing the connector housing 110 (and accordingly the ferrule 108) to be fully inserted into the release housing 170 in only one rotational orientation, the optical fiber or fibers extending through the ferrule 108 may be rotationally aligned with a corresponding optical fiber or fibers of a closure 200 (FIG. 1), as described in greater detail herein.

While in the embodiment depicted in FIGS. 3A and 3C, the connector keying portion 114 of the connector housing 110 is described and depicted as a negative cutout and the inward release keying portion 182 of the release housing 170 is described and depicted as being a positive surface projection, it should be understood that this is merely an example. In embodiments, the connector keying portion 114 of the connector housing 110 and the inward release keying portion 182 of the release housing 170 may include any suitable complementary shapes to restrict rotation between the release housing 170 and the connector housing 110 and to ensure rotational alignment between the release housing 170 and the connector housing 110. For example, in embodiments, the connector keying portion 114 may be a positive surface projection extending outward from the outer surface 116 of the connector housing 110, and the inward release keying portion 182 may be a negative cutout extending into the release inner surface 186 of the release housing 170.

Figure 4:
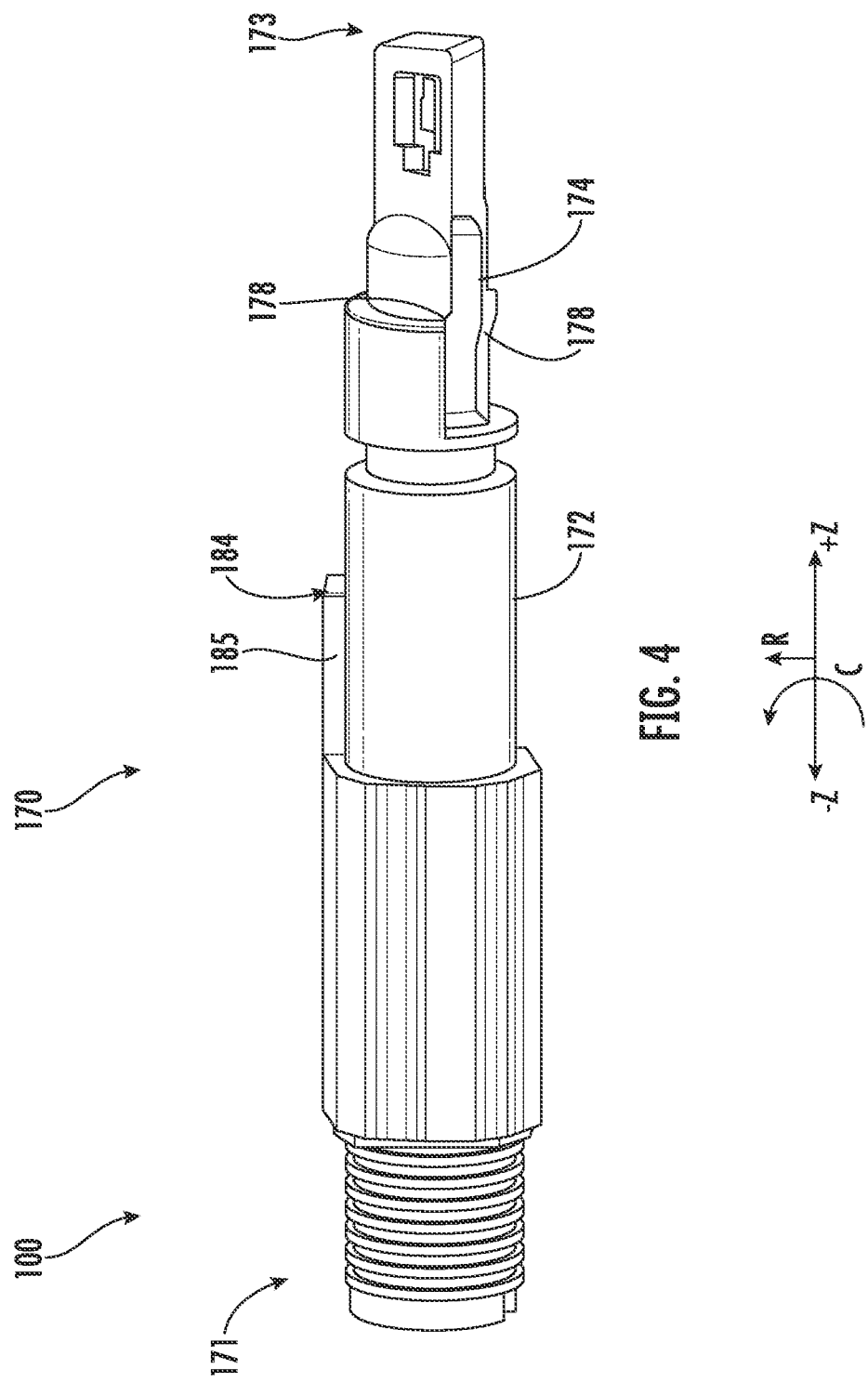
FIG. 4 schematically depicts a side isometric view of the release housing of FIG. 2A, according to one or more embodiments shown and described herein.

Referring to FIG. 4 a side isometric view of the release housing 170 is schematically depicted. In embodiments, the release housing 170 defines a release slot 174 extending through the release outer surface 172. The release housing 170 may further define one or more release faces 178 that are selectively engageable with the conversion housing 140 (FIG. 2B), as described in greater detail herein. In the embodiment depicted in FIG. 4, the release housing 170 defines a pair of release faces 178 positioned opposite one another across the release slot 174, however, it should be understood that this is merely an example, and the release housing 170 may define a single release face or any suitable number of release faces. In embodiments, the release faces 178 face outwardly in the radial direction R and rearwardly in the longitudinal direction (i.e., in the −z-direction as depicted).

In embodiments, the release housing 170 defines an outward release keying portion 184 positioned on the release outer surface 172. The outward release keying portion 184 generally includes outward release contact surfaces 185 that are positioned opposite one another. For example, in the embodiment depicted in FIG. 4, the outward release keying portion 184 is formed as a positive surface projection extending outward form the release outer surface 172 in the radial direction R, and the outward release contact surfaces 185 face in opposite directions. The outward release contact surfaces 185 may engage a corresponding keying portion of the conversion housing 140 (FIG. 2B), as described in greater detail herein.

Figure 5:
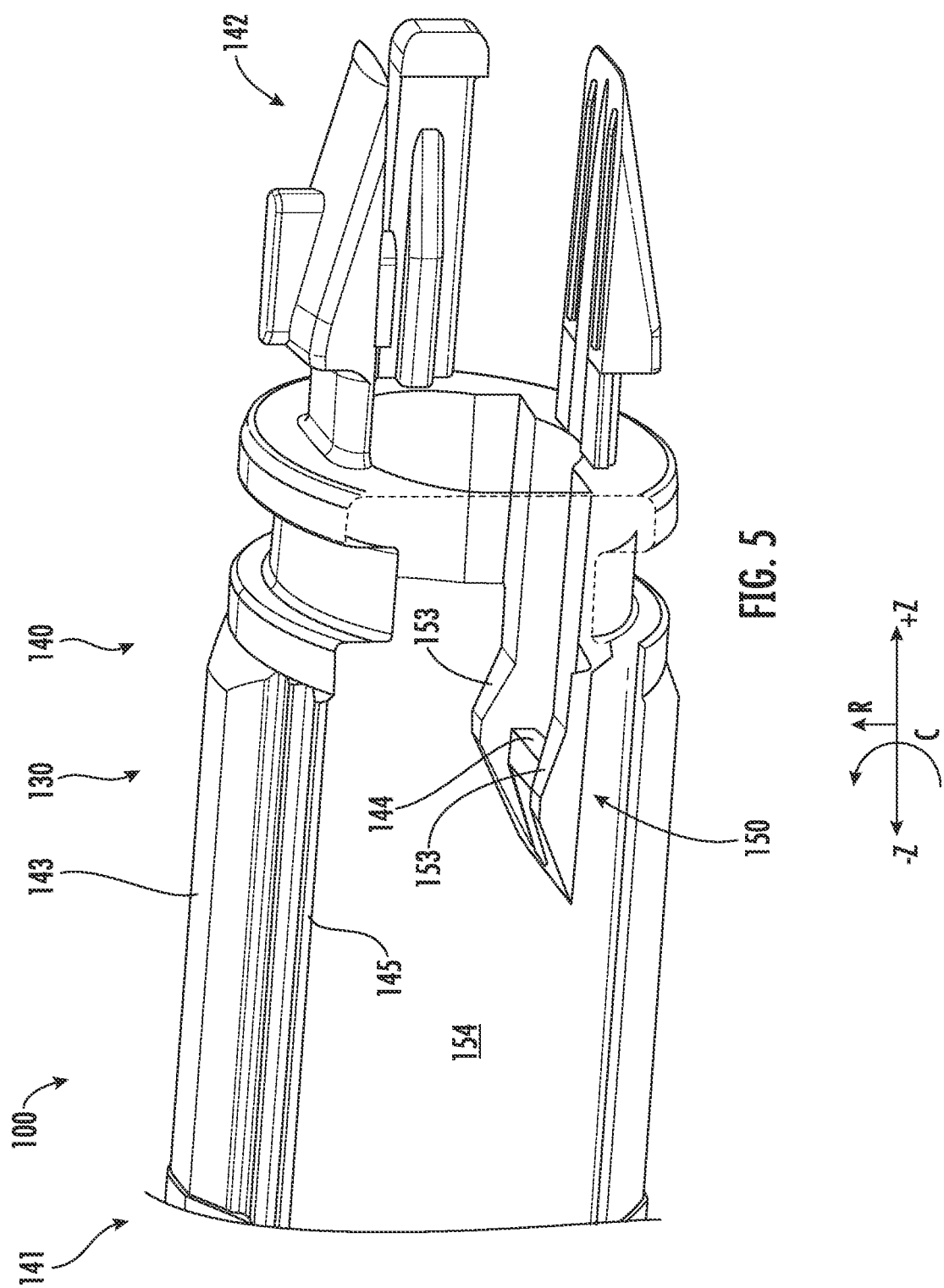
FIG. 5 schematically depicts a section isometric view of the conversion housing of FIG. 2A, according to one or more embodiments shown and described herein.
Figure 6:
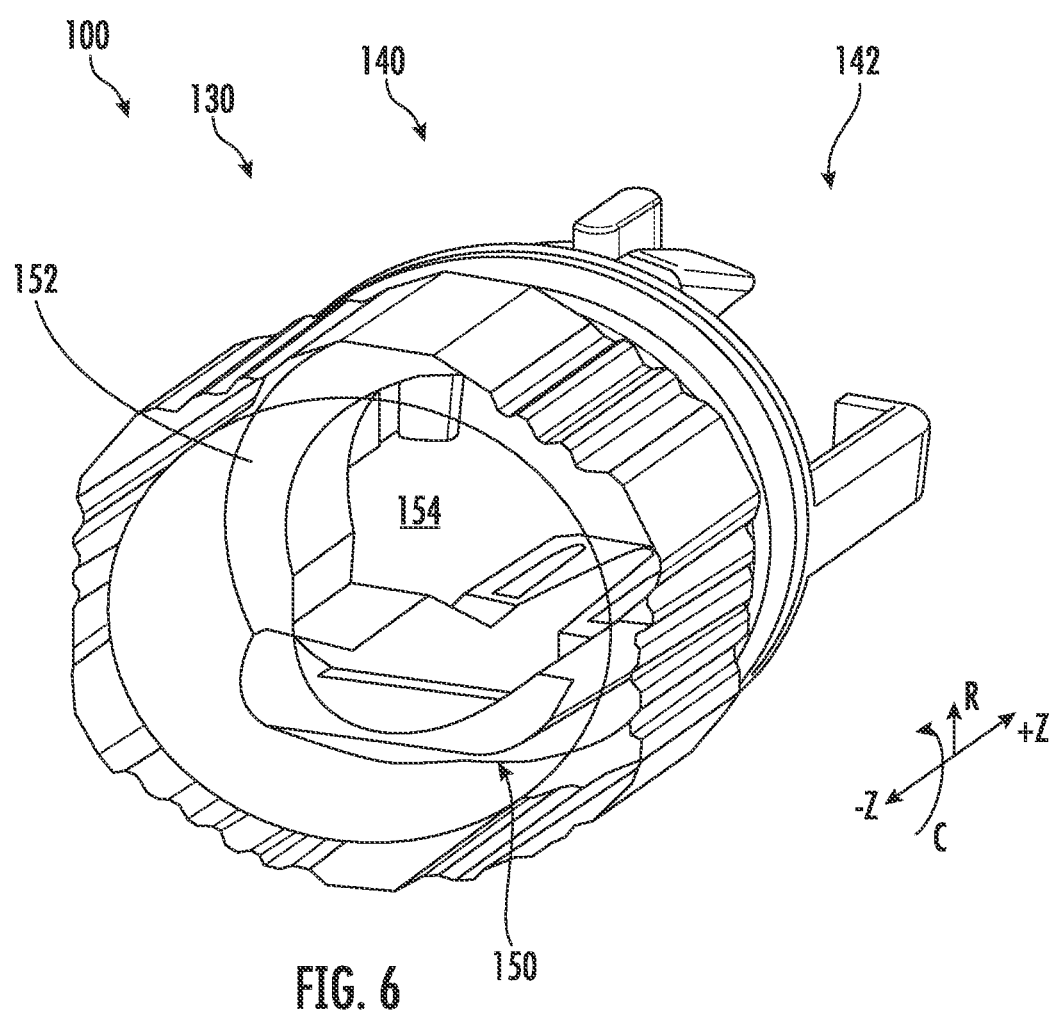
FIG. 6 schematically depicts a rear section view of the conversion housing of FIG. 5, according to one or more embodiments shown and described herein.

Referring to FIGS. 5 and 6, a side section view and a rear section view of the conversion housing 140 are schematically depicted, respectively. In embodiments, the conversion housing 140 extends between a conversion rear end 141 and a conversion front end 142 in the longitudinal direction (i.e., in the +/−z-direction as depicted). The conversion housing 140 generally defines a conversion outer surface 143 and a conversion inner sidewall 145 opposite the conversion outer surface 143. The conversion housing 140 further defines a conversion inner space 154 that may receive the release housing 170 (FIG. 4), as described in greater detail herein.

In embodiments, the conversion housing 140 includes a conversion retention member 150. The conversion retention member 150 generally defines a forwardly-facing connector engagement face 144 that is structurally configured to engage an engagement face of the connector housing 110 (FIG. 2B), as described in greater detail herein. In embodiments, the forwardly-facing connector engagement face 144 faces forward in the longitudinal direction (i.e., in the +z-direction as depicted). In some embodiments, the forwardly-facing connector engagement face 144 is orthogonal to the longitudinal direction (i.e., the +/−z-direction as depicted). In some embodiments, the forwardly-facing connector engagement face 144 may not be orthogonal to the longitudinal direction (i.e., the +/−z-direction as depicted), and may face at least partially outwardly or inwardly in the radial direction R. As described in greater detail herein, the orientation of the forwardly-facing connector engagement face 144 with respect to the longitudinal direction (i.e., the +/−z-direction as depicted) may restrict the withdrawal of the connector housing 110 (FIG. 2B) from the conversion housing 140.

In some embodiments, the conversion retention member 150 defines a rearwardly-facing ramp 151 opposite the forwardly-facing connector engagement face 144. The rearwardly-facing ramp 151 may face rearward in the longitudinal direction (i.e., in the −z-direction as depicted) and may face at least partially inward in the radial direction R. When the connector housing 110 (FIG. 3A) and/or the release housing 170 (FIG. 4) are inserted into the conversion housing 140, the connector housing 110 and/or the release housing 170 may engage the rearwardly-facing ramp 151 of the conversion retention member 150. Because the rearwardly-facing ramp 151 faces at least partially inward in the radial direction R, as the connector housing 110 (FIG. 3A) and/or the release housing 170 (FIG. 4) are inserted into the conversion housing 140 in the longitudinal direction (i.e., in the +z-direction as depicted), the conversion retention member 150 may deflect outwardly in the radial direction R.

In some embodiments, the conversion retention member 150 defines a forwardly-facing conversion release face 153.

In the embodiment depicted in FIG. 5, the conversion retention member 150 defines a pair of forwardly-facing conversion release faces 153 that are positioned on opposite sides of the forwardly-facing connector engagement face 144. In embodiments, the forwardly-facing conversion release faces 153 may face forward in the longitudinal direction (i.e., in the +z-direction as depicted) and inward in the radial direction R. The forwardly-facing conversion release faces 153 may engage the release faces 178 (FIG. 4) of the release housing 170 (FIG. 4), as described in greater detail herein.

Referring to FIGS. 7A and 7B, an isometric section view and a side section view of the conversion housing 140 is schematically depicted. In embodiments, the conversion inner space 154 is defined at least in part by the conversion inner sidewall 145 and a forward conversion ledge 152. The forward conversion ledge 152 is positioned at the conversion front end 142 and may generally extend inwardly in the radial direction from the conversion inner sidewall 145 in the radial direction R. In some embodiments, the forward conversion ledge 152 may be oriented transverse to the longitudinal direction (i.e., the +/−z-direction as depicted) and may limit the insertion of the release housing 170 (FIG. 4) and/or the connector housing 110 (FIG. 2B) into the conversion inner space 154.

As shown in FIGS. 7A and 7B, in some embodiments, the conversion retention member 150 extends rearwardly from the forward conversion ledge 152 into the conversion inner space 154. For example, in the embodiment depicted in FIGS. 7A and 7B, the conversion retention member 150 is a cantilever extending rearwardly from the forward conversion ledge 152, however, it should be understood that this is merely an example.

In embodiments, the conversion retention member 150 intersects at the forward conversion ledge 152 at a transition intersection 156. Without being bound by theory, the shape and structure of the transition intersection 156 impacts the movement of the conversion retention member 150 in the radial direction R, for example, under the application of force. While in the embodiment depicted in FIG. 7B the forward conversion ledge 152 and the conversion retention member 150 form a generally perpendicular transition intersection 156, it should be understood that this is merely an example.

For example and referring to FIG. 7C, in some embodiments, at least a portion of the transition intersection 156 is transverse to the forward conversion ledge 152 and the conversion retention member 150. In particular, in the embodiment depicted in FIG. 7C, the transition intersection 156 defines a fillet between the forward conversion ledge 152 and the conversion retention member 150. By defining a fillet between the forward conversion ledge 152 and the conversion retention member 150, stress concentration at the transition intersection 156 may be reduced. Further, by defining a fillet between the forward conversion ledge 152 and the conversion retention member 150, the conversion retention member 150 may resist deflection in the radial direction R. As noted above, the conversion retention member 150 may deflect outwardly in the radial direction, for example, upon insertion of the connector housing 110 (FIG. 3) and/or release housing 170 (FIG. 4) into the conversion housing 140. However, the conversion retention member 150 may generally retain the connector housing 110 (FIG. 3A) within the conversion housing 140, and outward deflection of the conversion retention member 150 may inadvertently release the connector housing 110 from the conversion housing 140. Accordingly, the shape of the transition inter-section 156 may be selected to permit deflection of the conversion retention member 150 in the radial direction R to allow insertion of the connector housing 110 (FIG. 3A) and the release housing 170 (FIG. 4) into the conversion housing 140. However, the shape of the transition intersection 156 may also be selected to resist deflection of the conversion retention member 150 in the radial direction R to restrict inadvertent release of the connector housing 110, as described in greater detail herein. In embodiments, a thickness of the conversion retention member 150 evaluated in the radial direction R may also be selected such that the conversion retention member 150 deflects in the radial direction R to allow insertion of the connector housing 110 (FIG. 3A) and the release housing 170 (FIG. 4) into the conversion housing 140. However, the thickness of the conversion retention member 150 may also be selected to resist deflection of the conversion retention member 150 in the radial direction R to restrict inadvertent release of the connector housing 110.

Figure 9:
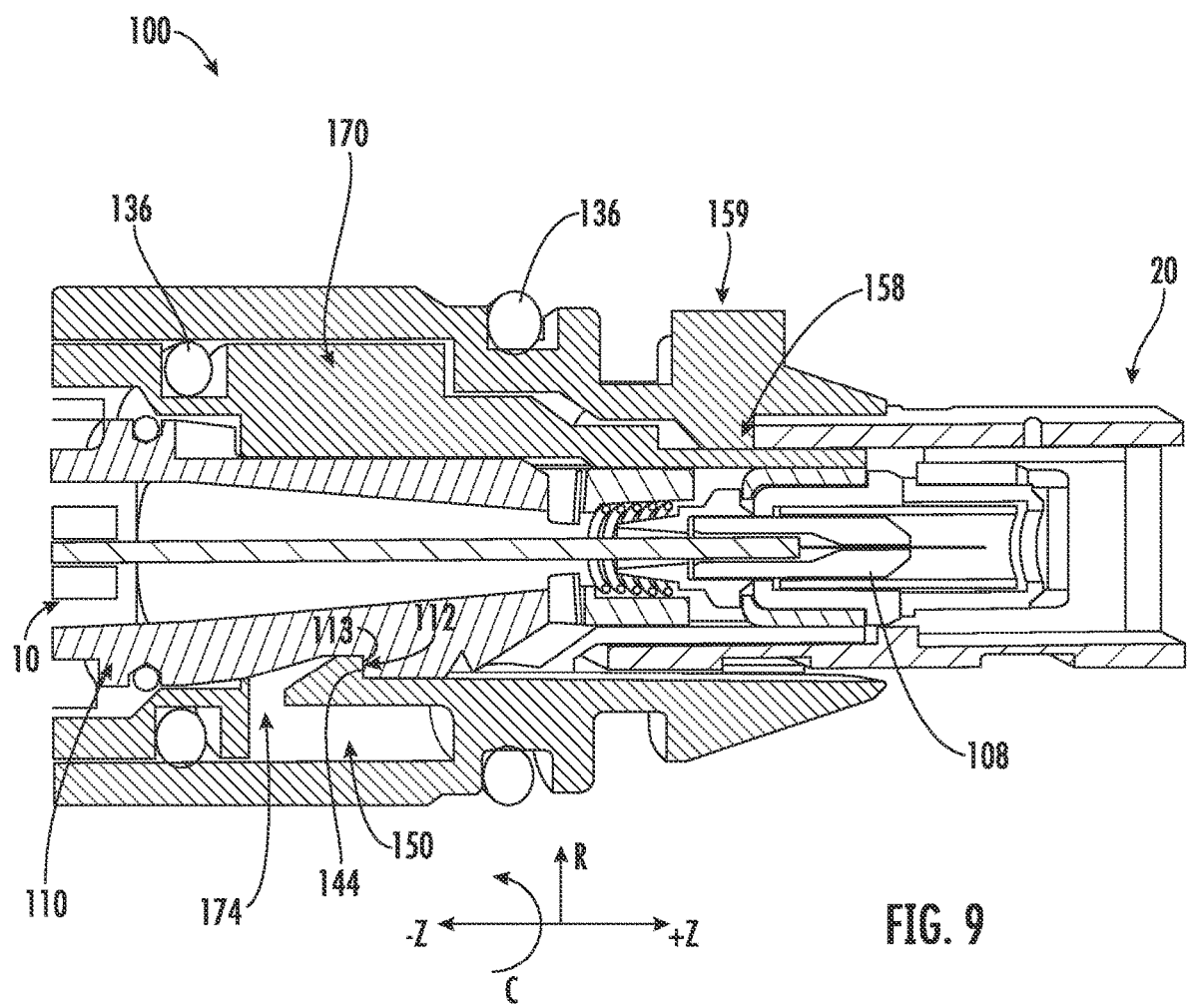
FIG. 9 schematically depicts a section view of the fiber optic connector assembly of FIG. 8 engaged with the receptacle of FIG. 8, according to one or more embodiments shown and described herein.

Referring to FIGS. 8 and 9, an exploded view of the fiber optic connector assembly 100 and a section view of the fiber optic connector assembly 100 are depicted, respectively. When assembled, the connector housing 110 is inserted at least partially into the release housing 170, as shown in FIG. 8. The release housing 170 and the connector housing 110 are inserted at least partially into the conversion housing 140.

As shown in FIG. 8, in embodiments, the conversion housing 140 may include a rearward conversion keying feature 160 that is configured to engage the outward release keying portion 184. For example, in the embodiment depicted in FIG. 8, the rearward conversion keying feature 160 defines opposing contact surfaces 162 that are configured to engage the contact surfaces 185 of the outward release keying portion 184 of the release housing 170. In the embodiment depicted in FIG. 8, the rearward conversion keying feature 160 is depicted as being a slot that receives the outward release keying portion 184, however, it should be understood that this is merely an example. In embodiments, the rearward conversion keying feature 160 may include any suitable keying feature for interfacing with the outward release keying portion 184 of the release housing 170.

Referring to FIG. 9, the connector housing 110 is generally inserted at least partially into the release housing 170, and the release housing 170 and the connector housing 110 are at least partially inserted into the conversion housing 140.

As noted above, the connector housing 110 may be rotationally aligned with respect to the release housing 170 via the connector keying portion 114 (FIG. 3A) of the connector housing 110 and the inward release keying portion 182 (FIG. 3B) of the release housing 170. The release housing 170 is rotationally aligned with the conversion housing 140 via the outward release keying portion 184 (FIG. 3B) of the release housing 170 and the rearward conversion keying feature 160 (FIG. 8) of the conversion housing 140 (FIG. 8). In this way, the connector housing 110 is rotationally aligned with the release housing 170, which is in turn rotationally aligned with the conversion housing 140, such that the connector housing 110 is rotationally aligned with the conversion housing 140.

In some embodiments, the conversion housing 140 defines a forward conversion keying feature 158. The forward conversion keying feature 158 may cooperate with a slot 22 (FIG. 8) of the coupling 20 as the conversion housing 140 is inserted into the coupling 20. For example, the conversion housing 140 may be restricted from being inserted into the coupling 20 unless the forward conversion keying feature 158 is rotationally aligned with the slot 22 (FIG. 8) of the coupling 20. By rotationally aligning the conversion housing 140 with the coupling 20, the connector housing 110 may be rotationally aligned with the coupling 20 (e.g., through the conversion housing 140 and the release housing 170). By rotationally aligning the connector housing 110 with the coupling 20, the ferrule 108 may be rotationally aligned with the coupling 20 such that the optical fiber or optical fibers extending through the ferrule 108 may be optically coupled to an optical fiber or optical fibers of an opposing ferrule positioned within the coupling 20. In some embodiments, the conversion housing 140 may define a conversion guide 159 extending outward from the conversion housing 140, where the conversion guide 159 is aligned with the forward conversion keying feature 158. The conversion guide 159 may assist in providing a visual indication of the rotational position of the forward conversion keying feature 158 such that a user, such as a technician, may orient the forward conversion keying feature 158 with the slot 22 (FIG. 8) of the coupling 20.

In embodiments, the connector housing 110 defines a rotationally-discrete locking portion 112 on the outer surface 116 of the connector housing 110. In some embodiments, the rotationally-discrete locking portion 112 defines a connector locking face 113 that, in the embodiment depicted in FIG. 8 faces rearwardly in the longitudinal direction (i.e., in the −z-direction as depicted). In embodiments, the conversion retention member 150 is positionable in an engaged position as shown in FIG. 9. In the engaged position, the conversion retention member 150 restricts movement of the connector housing 110 with respect to the adapter assembly 130, and more particularly the conversion housing 140, in the longitudinal direction (e.g., in the +/−z-direction as depicted). For example, in the engaged position, the conversion retention member 150 may restrict movement of the connector housing 110 with respect to the conversion housing 140 in the −z-direction as depicted, thereby restricting withdrawal of the connector housing 110 from the conversion housing 140. In particular and as shown in FIG. 9, the forwardly-facing connector engagement face 144 of the conversion retention member 150 may engage the connector locking face 113 of the connector housing 110, thereby restricting movement of the connector housing 110 in the −z-direction as depicted. In embodiments, the conversion retention member 150 may be positioned at least partially within the release slot 174 (FIG. 4) of the release housing such that the forwardly-facing connector engagement face 144 of the conversion retention member 150 may access the connector housing 110.

Figure 10:
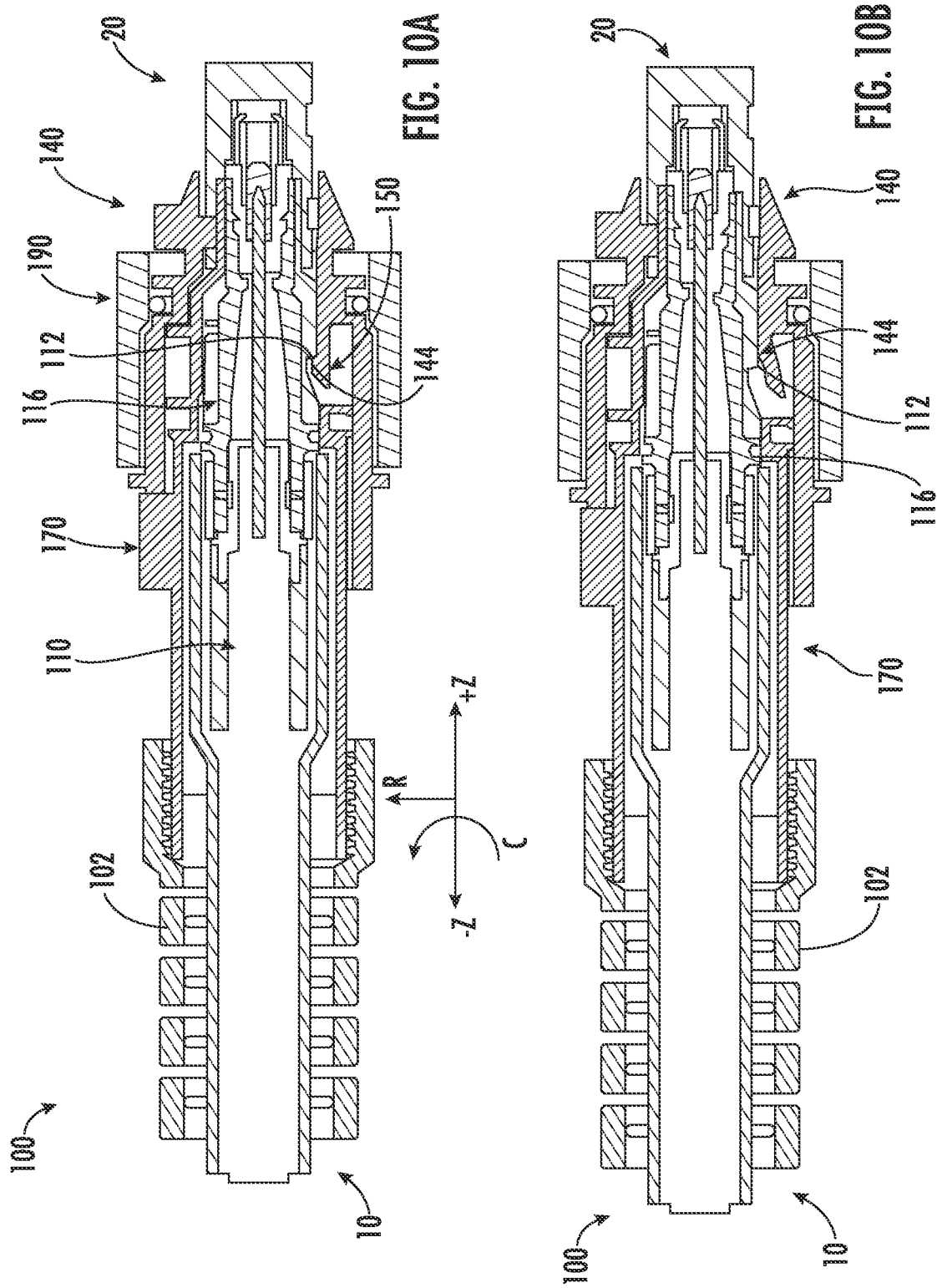
FIG. 10A schematically depicts a section view of the fiber optic connector assembly of FIG. 2A with the conversion housing in an engaged position, according to one or more embodiments shown and described herein.
FIG. 10B schematically depicts a section view of the fiber optic connector assembly of FIG. 2A with the conversion housing in a disengaged position, according to one or more embodiments shown and described herein.

Referring to FIGS. 10A and 10B, a section view of the fiber optic connector assembly 100 is depicted with the conversion retention member 150 in the engaged position and in a disengaged position. As shown in FIG. 10B, in the disengaged position, the connector housing 110 is movable with respect to the adapter assembly 130, and more particularly the conversion housing 140, in the longitudinal direction (i.e., in the −z-direction as depicted).

More particularly and referring to FIGS. 4, 5, and 10B the conversion retention member 150 may be moved into the disengaged position by the release housing 170. For example, in embodiments, the release housing 170 may be moved rearward in the longitudinal direction (i.e., in the −z-direction as depicted). As the release housing 170 moves rearward in the longitudinal direction (i.e., in the −z-direction as depicted), the release faces 178 of the release housing 170 may engage the forwardly-facing conversion release faces 153 of the conversion retention member 150. In embodiments, the release housing 170 may be moved rearward in the longitudinal direction (i.e., in the −z-direction as depicted) by a user, such as a technician. In some embodiments, the boot 102 is coupled to the release housing 170, and the release housing 170 can be moved rearward in the longitudinal direction (i.e., in the −z-direction as depicted) by moving the boot 102 rearward in the longitudinal direction.

As the release faces 178 of the release housing 170 engage the forwardly-facing conversion release faces 153 of the conversion retention member 150, the release faces 178 move the conversion retention member 150 outward in the radial direction R. For example and as noted above, in some embodiments, the conversion release faces 153 of the conversion retention member 150 may be face inward in the radial direction R. Accordingly, as the release housing 170 moves rearward in the longitudinal direction (i.e., in the −z-direction as depicted), the rearward movement of the release housing 170 may resolve into an outwardly radial force acting on the conversion retention member 150. Similarly, in embodiments in which the release faces 178 face outwardly in the radial direction R, as the release housing 170 moves rearward in the longitudinal direction (i.e., in the −z-direction as depicted), the rearward movement of the release housing 170 may resolve into an outwardly radial force acting on the conversion retention member 150.

As the conversion retention member 150 moves outward in the radial direction R the forwardly-facing connector engagement face 144 from the conversion retention member 150 disengages the rotationally-discrete locking portion 112 of the connector housing 110. With forwardly-facing connector engagement face 144 of the conversion retention member 150 disengaged from the rotationally-discrete locking portion 112 of the connector housing 110, the connector housing 110 can be removed from the conversion housing 140.

As such, the connector housing 110 can be disengaged from the conversion housing 140, and accordingly the coupling 20, through movement of the release housing 170 in the longitudinal direction (i.e., in the −z-direction as depicted). In this way, the connector housing 110 can be removed from the coupling 20 even when there is minimal distance between the connector housing 110 and other connector housings in the radial direction R. More particularly, while the conversion retention member 150 moves outward in the radial direction R to move from the engaged position to the disengaged position, this movement is generally within the conversion inner space 154. As such, the connector housing 110 can be disengaged from the conversion housing 140, and accordingly from the coupling 20, without requiring movement of components external to the conversion housing 140 in the radial direction R. Because the connector housing 110 can be disengaged from the conversion housing 140, and accordingly the coupling 20, without requiring movement of components external to the conversion housing 140 in the radial direction R, couplings 20 can be positioned adjacent to one another so as to minimize the distance between adjacent connector housings 110. In this way, closures 200 (FIG. 1) may include couplings 20 that are positioned adjacent to one another so as to minimize the distance between adjacent connector housings 110.

Referring to FIG. 11, an isometric view of another release housing 170 is schematically depicted. Like the embodiment described above and depicted in FIG. 4, the release housing 170 includes the release slot 174 and the one or more release faces 178. However, in the embodiment depicted in FIG. 11, the release housing 170 further includes a release retainer 180. As shown in FIG. 11, the release retainer 180 extends over at least a portion of the release slot 174.

Figure 12:
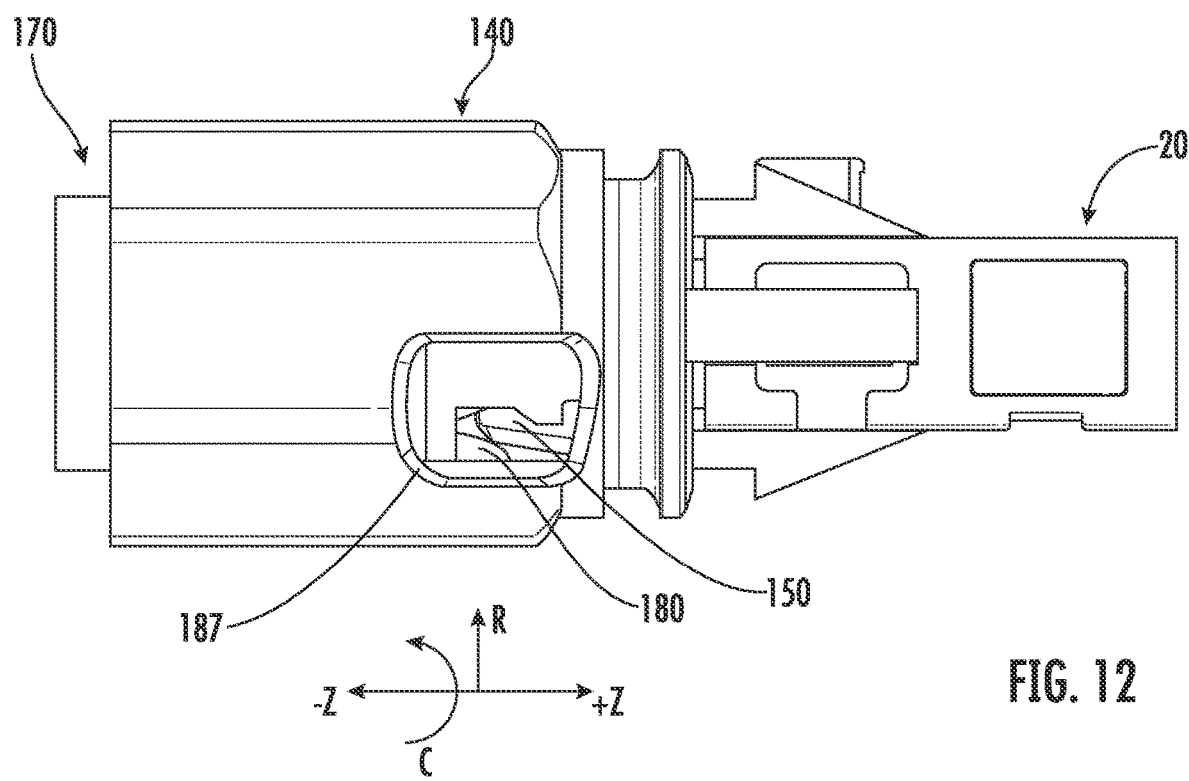
FIG. 12 schematically depicts a side view of a fiber optic connector assembly including the release housing of FIG. 11, according to one or more embodiments shown and described herein.

Referring to FIG. 12, in embodiments, a side view of the release housing 170 and the conversion housing 140 is depicted. The conversion housing 140 includes a window 187 through which the release retainer 180 of the release housing 170 can be viewed, however, it should be understood that this merely an example, and conversion housings 140 according to the present disclosure may not have the window 187.

As shown in FIG. 12, in embodiments, the release retainer 180 may engage the conversion retention member 150 of the conversion housing 140 and may restrict movement of the conversion retention member 150 outward in the radial direction R when the release housing 170 is fully inserted into the conversion housing 140. However, when the conversion housing 140 is moved rearward in the longitudinal direction (i.e., in the −z-direction as depicted), the release retainer 180 may disengage the conversion retention member 150, thereby allowing the conversion retention member 150 to move to the disengaged position as shown in FIG. 10B. Accordingly, the release retainer 180, in embodiments, may restrict inadvertent movement of the conversion retention member 150 while the release housing 170 is fully inserted into the conversion housing 140, while allowing the conversion retention member 150 to move to the disengaged position as the conversion housing 140 is moved rearward in the longitudinal direction (i.e., in the −z-direction as depicted).

Accordingly, embodiments described herein are generally directed to fiber optic connector assemblies including a connector housing and an adapter assembly including a conversion housing and a release housing. The conversion housing may generally permit the connector housing to be engaged with a dissimilar coupling, for example of a closure. The connector housing may be selectively coupled to, and may be releasable from the conversion housing via the release housing, thereby allowing the connector housing to be selectively coupled to and released from the dissimilar coupling and/or closure.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A fiber optic connector assembly comprising:
a connector housing defining a rotationally-discrete locking portion defined on an outer surface of the connector housing;
an adapter assembly selectively coupled to the connector housing, the adapter assembly comprising:
a conversion housing extending around the connector housing and defining a conversion front end and a conversion retention member that is positionable between an engaged position, in which the conversion retention member restricts movement of the connector housing with respect to the adapter assembly in an axial direction, and a disengaged position, in which the connector housing is movable with respect to the adapter assembly in the axial direction; and
a release housing positioned between the conversion housing and the connector housing, the release housing defining a release front end positionable at least partially within the conversion housing, and a release face selectively engageable with the conversion retention member and configured to move the conversion retention member from the engaged position to the disengaged position,
wherein the release housing defines a release outer surface extending the axial direction, and a release slot extending through the release outer surface, and wherein the conversion retention member is positioned at least partially within the release slot in the engaged position, and wherein the release housing defines a release retainer extending over at least a portion of the release slot.

2. The fiber optic connector assembly of claim 1, further comprising a boot coupled to the release housing opposite the release front end.

3. The fiber optic connector assembly of claim 1, wherein:
the conversion retention member of the conversion housing defines forwardly-facing connector engagement face; and
the rotationally-discrete locking portion of the connector housing defining a connector locking face.

4. The fiber optic connector assembly of claim 3, wherein the conversion retention member of the conversion housing defines a release face that is transverse to the forwardly-facing connector engagement face.

5. The fiber optic connector assembly of claim 4, wherein the release face faces inward in a radial direction that is transverse to the axial direction.

6. The fiber optic connector assembly of claim 1, wherein the release housing defines one or more release faces that are selectively engageable with the conversion housing.

7. The fiber optic connector assembly of claim 6, wherein the one or more release faces face outwardly in a radial direction that is transverse to the axial direction.

8. The fiber optic connector assembly of claim 1, wherein the conversion housing defines a conversion inner sidewall and a forward conversion ledge and a conversion inner space, and wherein the conversion retention member extends rearwardly from the forward conversion ledge into the conversion inner space.

9. The fiber optic connector assembly of claim 8, wherein the conversion retention member intersects the forward conversion ledge at a transition intersection, wherein at least a portion of the transition intersection is transverse to the forward conversion ledge and the conversion retention member.

10. The fiber optic connector assembly of claim 1, wherein the release housing defines a release face positioned adjacent to the release slot, wherein the release face faces outward in a radial direction that is transverse to the axial direction.

11. The fiber optic connector assembly of claim 10, wherein the release face of the release housing is a first release face, and wherein the release housing further comprises a second release face, wherein the first release face and the second release face are positioned on opposite sides of the release slot.

12. The fiber optic connector assembly of claim 1, wherein the conversion front end defines a forward conversion keying feature structurally configured to engage an SC connector.

13. The fiber optic connector assembly of claim 1, wherein the release housing defines an inward release keying portion and wherein the connector housing defines a connector keying portion that is engaged with the inward release keying portion.

14. The fiber optic connector assembly of claim 1, wherein the release housing defines an outward release keying portion and wherein the conversion housing defines a rearward conversion keying feature engaged with the outward release keying portion.

15. The fiber optic connector assembly of claim 1, wherein:
- the conversion retention member of the conversion housing defines forwardly-facing connector engagement face;
- the rotationally-discrete locking portion of the connector housing defining a connector locking face engaged with the forwardly-facing connector engagement face when the conversion retention member is in the engaged position;
- the conversion retention member of the conversion housing defines a release face that is transverse to the forwardly-facing connector engagement face;
- the release housing defines one or more release faces that are selectively engageable with the conversion housing; and
- the release face faces inward in a radial direction that is transverse to the axial direction.

* * * * *

UNITED STATES PATENT AND TRADEMARK OFFICE
CERTIFICATE OF CORRECTION

| | |
|---|---|
| PATENT NO. | : 11,880,076 B2 |
| APPLICATION NO. | : 17/527311 |
| DATED | : January 23, 2024 |
| INVENTOR(S) | : Guy Barthes et al. |

It is certified that error appears in the above-identified patent and that said Letters Patent is hereby corrected as shown below:

On the Title Page

In item (56), in Column 2, under "Other Publications", Line 1, delete "Plasti" and insert -- Plastic --.

On the page 2, in Column 1, under "U.S. Patent Documents", Line 52, delete "Ampert" and insert -- Lampert --.

On the page 2, in Column 1, under "U.S. Patent Documents", Line 57, delete "Eung" and insert -- Leung --.

On the page 2, in Column 2, under "U.S. Patent Documents", Line 20, delete "Loyd" and insert -- Lloyd --.

On the page 2, in Column 2, under "U.S. Patent Documents", Line 27, delete "Wano" and insert -- Iwano --.

On the page 3, in Column 1, under "U.S. Patent Documents", Line 21, delete "Mazu" and insert -- Imazu --.

On the page 3, in Column 1, under "U.S. Patent Documents", Line 35, delete "Uther" and insert -- Luther --.

On the page 3, in Column 1, under "U.S. Patent Documents", Line 68, delete "Oder" and insert -- Loder --.

On the page 3, in Column 2, under "U.S. Patent Documents", Line 44, delete "Ali" and insert -- Lail --.

On the page 4, in Column 1, under "U.S. Patent Documents", Line 44, delete "Ewallen" and insert -- Lewallen --.

Signed and Sealed this
Second Day of July, 2024

*Katherine Kelly Vidal*
Katherine Kelly Vidal
*Director of the United States Patent and Trademark Office*

CERTIFICATE OF CORRECTION (continued)
U.S. Pat. No. 11,880,076 B2

On the page 4, in Column 1, under "U.S. Patent Documents", Line 45, delete "Eeman" and insert
-- Leeman --.

On the page 5, in Column 2, under "U.S. Patent Documents", Line 67, delete "Ivan" and insert
-- Van --.

On the page 6, in Column 2, under "U.S. Patent Documents", Line 79, delete "Eeman" and insert
-- Leeman --.

On the page 10, in Column 2, under "Other Publications", Line 30, delete "Poeceedings" and insert
-- Proceedings --.

On the page 10, in Column 2, under "Other Publications", Line 36, delete "Ughtwave.," and insert
-- Lightwave., --.